(12) United States Patent
Moran et al.

(10) Patent No.: US 8,474,899 B2
(45) Date of Patent: Jul. 2, 2013

(54) RETRACTABLE TOP FOR OFF-ROAD VEHICLES

(75) Inventors: Jeffrey A. Moran, Ft. White, FL (US); Ali Azadi, Duluth, GA (US)

(73) Assignee: Omix-Ada, Inc., Suwanee, GA (US)

( * ) Notice: Subject to any disclaimer, the term of this patent is extended or adjusted under 35 U.S.C. 154(b) by 0 days.

(21) Appl. No.: 13/469,384

(22) Filed: May 11, 2012

(65) Prior Publication Data

US 2012/0286540 A1 Nov. 15, 2012

Related U.S. Application Data

(60) Provisional application No. 61/485,172, filed on May 12, 2011.

(51) Int. Cl.
*B60P 7/02* (2006.01)

(52) U.S. Cl.
USPC ............................... 296/100.18; 296/107.01

(58) Field of Classification Search
USPC .................. 296/107.01, 100.18, 116, 114
See application file for complete search history.

(56) References Cited

U.S. PATENT DOCUMENTS

| | | | | |
|---|---|---|---|---|
| 5,992,917 A * | 11/1999 | Hilliard et al. | ................. | 296/103 |
| 6,095,589 A * | 8/2000 | Kinnanen et al. | ......... | 296/107.09 |
| 6,295,713 B1 * | 10/2001 | Hilliard et al. | ................... | 29/446 |
| 6,409,248 B1 * | 6/2002 | Bores | ............................ | 296/122 |
| 6,981,914 B2 * | 1/2006 | Veenstra | ....................... | 454/164 |

* cited by examiner

*Primary Examiner* — Lori Lyjak
(74) *Attorney, Agent, or Firm* — Womble Carlyle Sandridge & Rice, LLP

(57) ABSTRACT

A retractable top is disclosed for off-road vehicle such as Jeep® Wrangler® and CJ® brand vehicles. The top includes a frame and a fabric cover designed to cover and move with the frame. The frame includes a base plate that is secured to the belt rail surrounding the rear compartment of the vehicle. The top is deployable between a stowed configuration folded upon itself over the rear compartment of a vehicle and a deployed configuration covering the passenger and rear compartments of the vehicle. During deployment, the top unfolds in a substantially vertical direction over the rear compartment substantially to its full extent. This avoids collision with the rear doors and roll bars of the vehicle. Once so deployed, the entire top pivots downwardly into place covering the passenger and rear compartments of the vehicle.

31 Claims, 21 Drawing Sheets

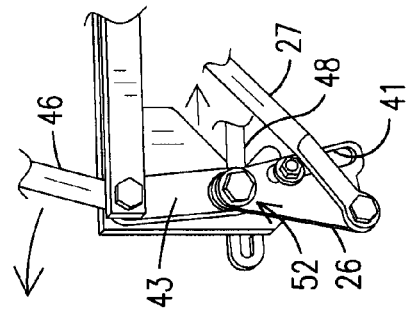
FIG. 7a
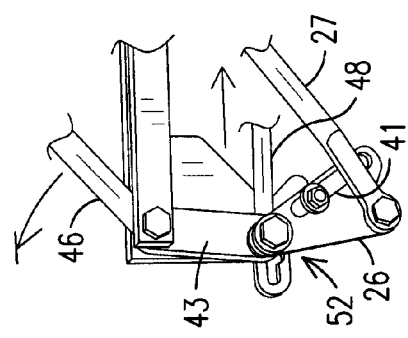
FIG. 7b
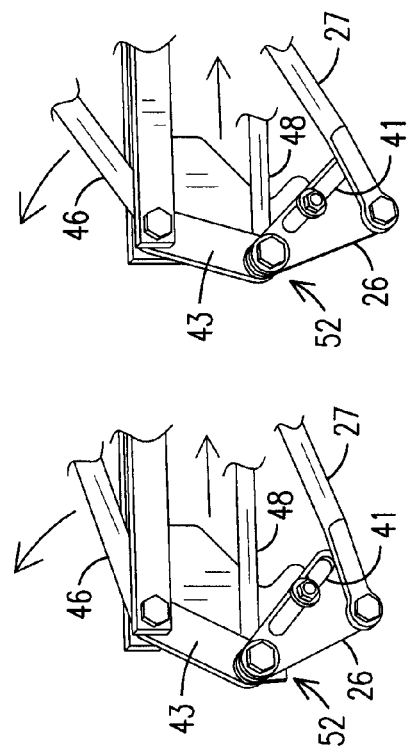
FIG. 7c
FIG. 7d
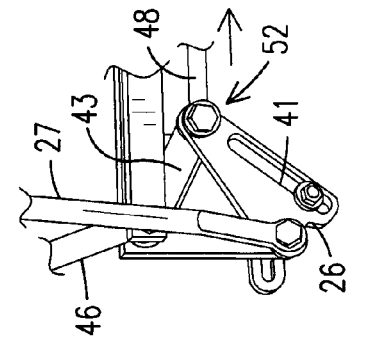
FIG. 7e
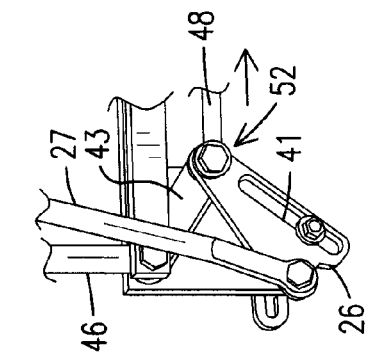
FIG. 7f
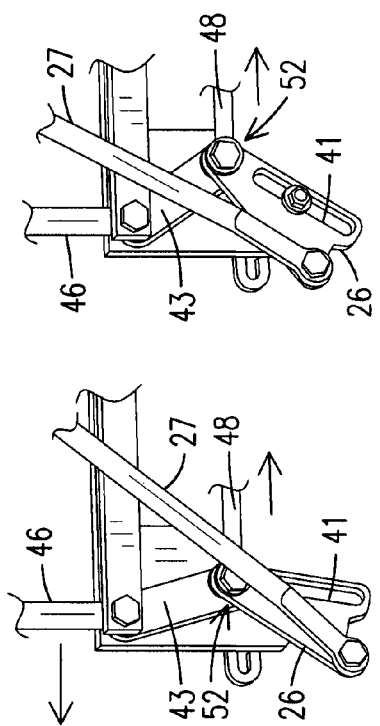
FIG. 7g
FIG. 7h

RETRACTABLE TOP FOR OFF-ROAD VEHICLES

REFERENCE TO RELATED APPLICATION

Priority is hereby claimed to the filing date of U.S. provisional patent application No. 61/485,172 filed on 12 May 2011.

TECHNICAL FIELD

This disclosure relates generally to off-road vehicles and more specifically to open top Jeep® brand vehicles such as the Wrangler® and to deployable and retractable tops for such vehicles.

BACKGROUND

Off-road vehicles such as the Jeep® Wrangler® and CJ® are popular among outdoor enthusiasts because of their rugged build and appearance and consequent ability to move over terrain where other vehicles cannot tread. The Wrangler® and CJ® models have open passenger compartments and an open rear compartment. Factory soft tops are available for these vehicles that can be manually attached to the vehicle with snaps, a belt rail system, locking tabs, and the like to enclose the passenger and rear compartments. Factory tops, however, are cumbersome to install and can require several minutes for complete deployment.

Some past attempts to create an easily deployable soft top for the Jeep® Wrangler® and CJ® have been made, but with limited success. Applicant believes, for example, that Chrysler once attempted to offer a powered top for these vehicles, but that product is no longer available. U.S. Pat. No. 6,439,643 of Barker discloses a manually deployable soft top that attaches to the floor of the rear compartment and is deployable from a folded configuration in the rear compartment to a deployed configuration covering the passenger and rear compartments of the vehicle. This product too has met with limited success.

One problem in designing a deployable top for the Jeep® Wrangler® and CJ® vehicles is that the rear edges of the back doors in four-door models are very close to the rear compartment, where a retractable top would naturally be stowed. Further, the top edges of the doors are relatively high compared to the height of the belt rail surrounding the rear compartment. As a consequence, a retractable top for these vehicles must deploy first upwardly from the rear compartment virtually to its complete unfolded configuration and then pivot downwardly intact over the passenger compartment. This has heretofore been a significant challenge. Further, the sides of the top rails must spread out as the top pivots downwardly primarily because the passenger compartment of Jeep® brand vehicles is slightly wider at its rear end than at its front end. The top rails also need to spread to accommodate door edges, roll bars, and other features of the vehicle. As the top approaches full deployment, the top rails must narrow back together. Accommodating this motion also is a challenge. Other challenges unique to these vehicles also exist.

A need therefore exists for a retractable and deployable top for Jeep® Wrangler® and CJ® vehicles, and perhaps other appropriate vehicles, that addresses the above and other challenges. Such a top should be retractable to a stowed configuration where it is out of the way for enjoyment of the open top feature the vehicles, but should be quickly and easily deployable to cover the passenger and rear compartments of the vehicle. Hydraulic or electric actuators should be optionally available to incorporate into the top such that the top can be deployed and retracted automatically at the press of a button. It is to the provision of a retractable and deployable top that meets these and additional needs that the present disclosure is primarily directed.

SUMMARY

Briefly described, a retractable and deployable top for Jeep® Wrangler® and CJ® and perhaps other open-top off-road vehicles is disclosed. The top comprises a frame assembly that mounts to the existing belt rail surround the rear compartment of the vehicle and that supports a fabric cover. The frame assembly includes a frame that can be folded upon itself to rest over the rear compartment of the vehicle when not in use. When the top is desired, it can be deployed with hydraulic or electric actuators built into the frame of the top. Alternatively, the top may be deployed manually in an emergency or when actuators are not present or not used. During deployment, various brackets, linkages, accelerators, and cross bars cooperate to unfold the frame and its fabric cover and pivot it down over the passenger compartment of the vehicle. The top first unfolds almost directly upwardly over the rear compartment virtually to its full unfolded configuration, thereby avoiding collision with the doors of the vehicle during deployment. When the top is unfolded, its components further cooperate to pivot the unfolded top downwardly as a unit over the passenger compartment of the vehicle. The front edge of the top, which may incorporate the factory header of a factory soft top, can then be latched to the upper edge of the wind screen to secure the top in place. These steps are reversed to retract the top back to its folded and stowed position.

Forward ends of the frame are formed with a double breaking hinge arrangement to the forward end of which the header is attached. As the top pivots downwardly onto the vehicle, its sides spread out as mentioned above. When this happens, the double breaking hinge articulates to allow the outward spread of the top sides while still attached to the header spanning the forward ends of the frame. Numerous bars, linkages, tension cables, and straps cooperate as a system during deployment and retraction to ensure that the top unfolds and folds reliably and that the fabric of the top is supported when deployed to avoid water pooling on the top and excessive wind induced movement of the fabric.

These and other features, aspects, and advantages of the retractable top disclosed herein will become more apparent upon review of the detailed description set forth below taken in conjunction with the accompanying drawing figures, which are briefly described as follows.

BRIEF DESCRIPTION OF THE DRAWINGS

FIGS. 7a-7h is a sequence showing the progressive movement of the accelerator plate and various other components of the linkage of FIGS. 3-6 as the frame and top of this disclosure are deployed.

DETAILED DESCRIPTION

Figure 1A:
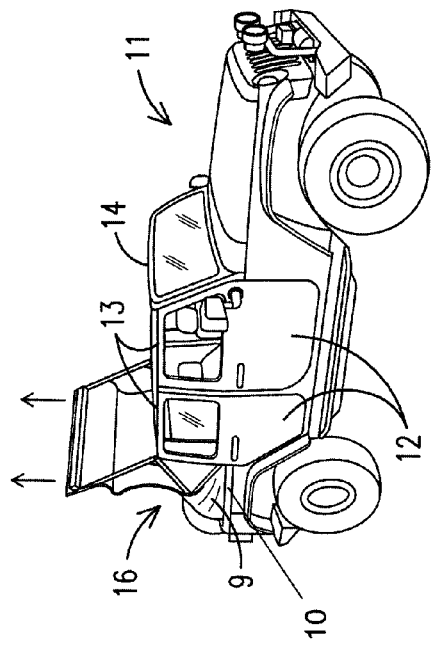
FIGS. 1*a*-1*d* illustrate sequentially the deployment of the top of this disclosure from its stowed configuration to its fully deployed configuration.

Referring now in more detail to the drawing figures, wherein like reference numerals indicate like parts throughout the several views, FIGS. 1a-1d show sequentially the deployment of the top of this disclosure on a Jeep® Wrangler® brand vehicle having four doors. The vehicle 11 has doors 12 on each side and the doors have upper edges 13. The upper edges 13 of the doors and the upper edge 14 of the wind screen surround the passenger compartment of the vehicle. A rear compartment 9 of the vehicle is located immediately behind the passenger compartment. It can be seen from these figures that the rear compartment is short relative to the passenger compartment and also that the rear edges of the back doors extend virtually vertically upwardly from the rear compartment.

Figure 1B:
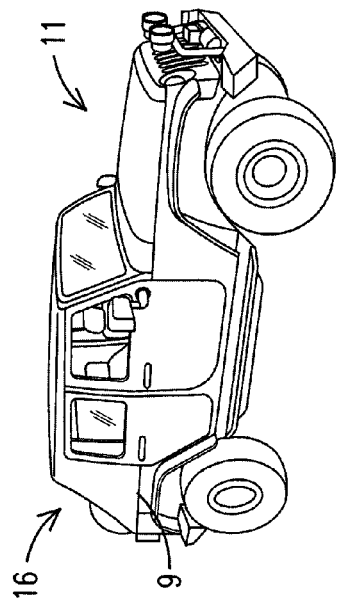
Figure 1C:
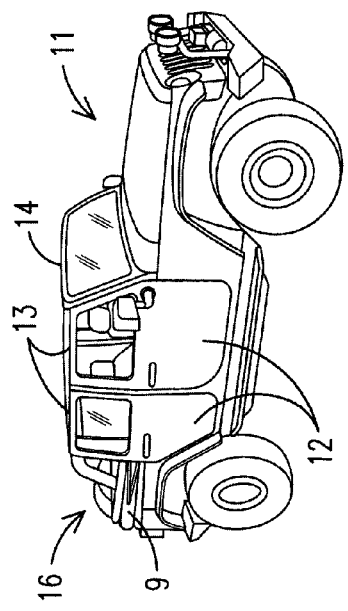
Figure 1D:
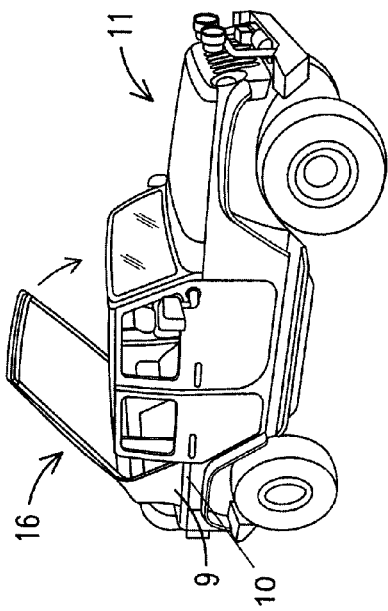

A top 16 according to this disclosure is secured to the belt rail 10 surrounding the rear compartment, and is deployable between a stowed configuration (FIG. 1a) and a deployed configuration (FIG. 1d). In the stowed configuration of FIG. 1a, the top is folded upon itself and overlies the rear compartment of the vehicle as shown. In FIG. 1b, the top is partially deployed. It can be seen here that the top comprises a frame and a fabric cover that unfold together. The fabric cover can be made of any appropriate material including, without limitation, cloth, vinyl, canvas, rip-stop material and any other material commonly used in the industry for retractable top covers. The term "fabric" is intended to encompass all materials suitable for use as a cover material. It can further be seen that the frame and cover are initially unfolded in a substantially vertical direction over the rear compartment of the vehicle. This is necessary because of the vertical and upwardly extending rear edges of the back doors and the roll bars of the vehicle. If the top were deployed forwardly, it would hit these and other features of the vehicle and could not be deployed.

FIG. 1c shows the top 16 deployed substantially to its full unfolded configuration; that is, the upper cover of the top is stretched generally flat. The entire top in this figure is now pivoting downwardly intact as indicated by the arrow onto the passenger compartment of the vehicle, after having been initially deployed upwardly over the rear compartment. In FIG. 1d, the top is fully pivoted down and covers the passenger compartment and the rear compartment of the vehicle. The driver has latched the front header of the top to the upper edge of the windscreen to secure the top in place. To retract the top, the sequence is reversed. In the illustrated embodiment, the top is deployed and retracted automatically with hydraulic cylinders fed by a hydraulic pump, which may be located in the stock storage well below the rear compartment. It will be understood, however, that the top may also be deployed by hand simply by grasping the frame, pulling it up over the rear compartment, and pivoting it down onto the passenger compartment. Both automatic and manual deployment and retraction of the top are within the scope of the invention.

Figure 2:
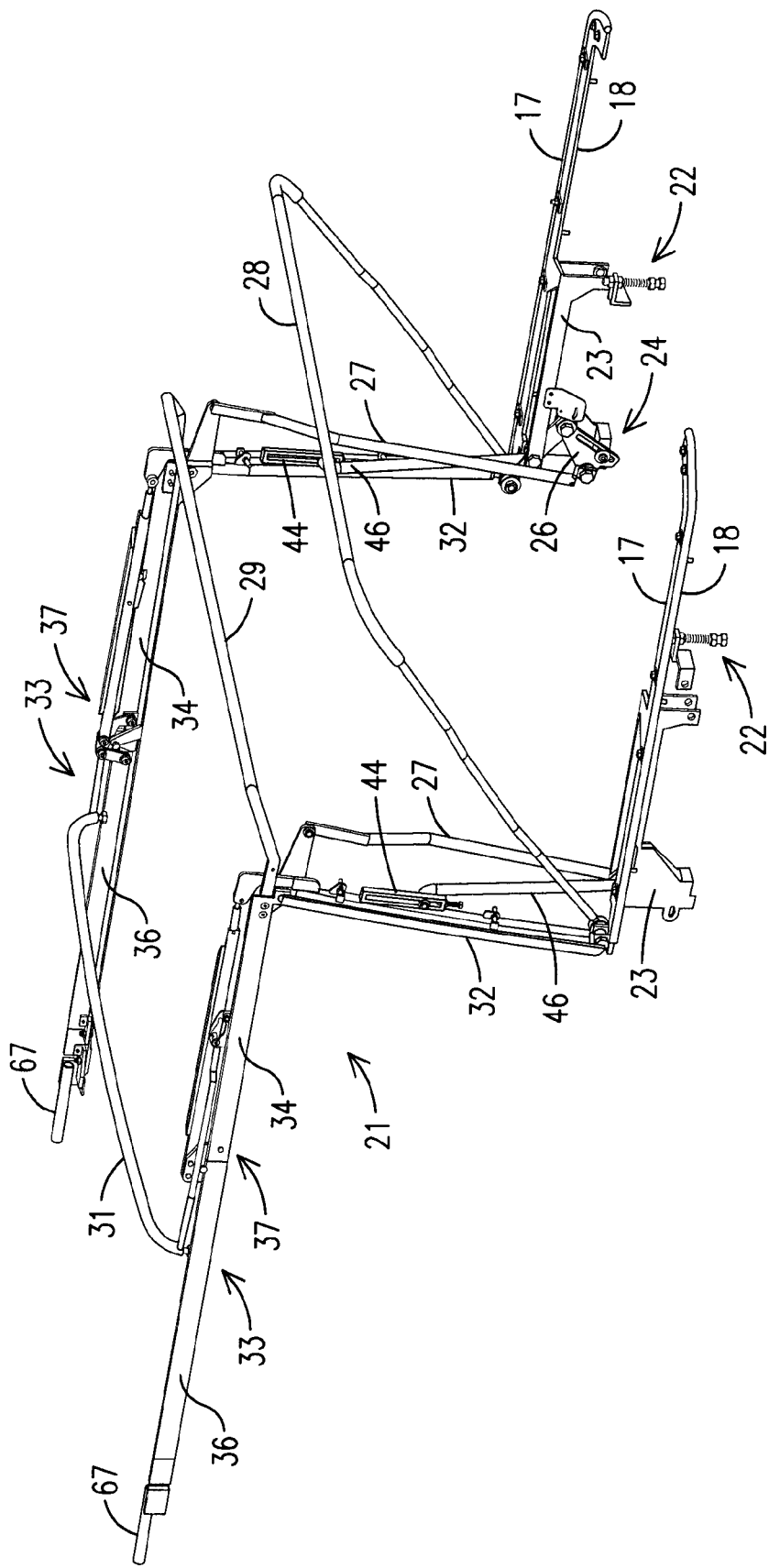
FIG. 2 is a perspective view showing one embodiment of the entire frame of the top fully deployed and illustrating various components and pivot points of the top.

FIG. 2 shows one embodiment of the frame assembly of the top onto which the fabric cover is mounted to form the top. The frame 21 includes pair of base plates 17 that are shaped and sized to fit atop and be fastened to the belt rail on either side of the rear compartment of a vehicle. A C-channel 18 may be formed or attached along the outer edges of each of the base plates 17 and the C-channels are configured to receive a spline incorporated into the fabric cover to secure the rear base of the fabric cover to the base plates. Perhaps more preferable, however, a bead or P-spline may be sewn onto the material of the top and the P-spline can then be slid into the existing P-channel of the stock belt rail itself, as detailed below. This eliminates the need to form the base plates with or supply them with auxiliary channels. In either event, a clean-looking and secure attachment is formed. A support bracket and post assembly 22 projects inwardly from each of the base plates and is located so that the bottoms of the posts can be threadably secured to the adjacent wheel well of the vehicle in the rear compartment. This provides support since the belt rails alone are not sufficiently strong to support the top, and allows for fine adjustments of the top to ensure that it is square and fits well on the vehicle when deployed.

Shoes 23 depend from the base plates 17 on each side of the frame. Each of the shoes supports a linkage assembly 24 (detailed below) at its forward end and provides an attachment point for a hydraulic or electrical actuator at its rear end. The support bracket and post 22 also is secured to the rearward end of the shoe. Vertical arms 32 are pivotally attached at their lower ends to the forward ends of the base plates and extend upwardly as shown when the top is deployed. Horizontal arms 33 are pivotally coupled to the top ends of the vertical arms and extend horizontally therefrom when the top is deployed. The vertical and horizontal arms frame the rear and top window edges when the top is deployed covering the passenger compartment of a vehicle. Each horizontal arm 33 comprises a rear section 34 and a forward section 36 connected by a pivot assembly 37, which is described in more detail below. Header bars 67 project from the forward ends of the horizontal arms 33 and are configured to receive a header that extends along the upper edge of the vehicle's wind screen when the top is deployed. The header bars can be configured to receive a factory header from a factory soft top if desired so that an owner need only remove the header from the factory soft top and install it on the header bars of the retractable top of this disclosure. Further, while not visible, the factory tailgate bar also is preferably removed from a factory top and installed along the lower back edge of the top of this disclosure to mate with the tailgate of the vehicle. Use of components already available to a vehicle owner lowers the cost and complexity of the top. However, these components also may be made available with the top of this disclosure if desired.

In the present embodiment, a cross bar 31 extends between the horizontal arms 33 for supporting the fabric cover over the passenger compartment. Similarly, fabric support bows 28 and 29 support the fabric cover at the rear of the passenger compartment and intermediate the rear compartment. Support bow 28 is hinged to the forward ends of the base plates and "floats" with the fabric of the top as the top deploys and retracts. The number and arrangement of these bars can be different than in the embodiment of FIG. 2, and an alternate embodiment illustrating this point is presented below. Deployment arms 46 have upper ends that ride in slotted blocks 44 and the lower limit of these upper ends within the slots can be set with set screws. In this way, the angle between the base plates and the vertical arms 32 can be adjusted so that the vertical arms and fabric cover fit well against the rear edges of the back doors when the top is deployed.

Figure 3:
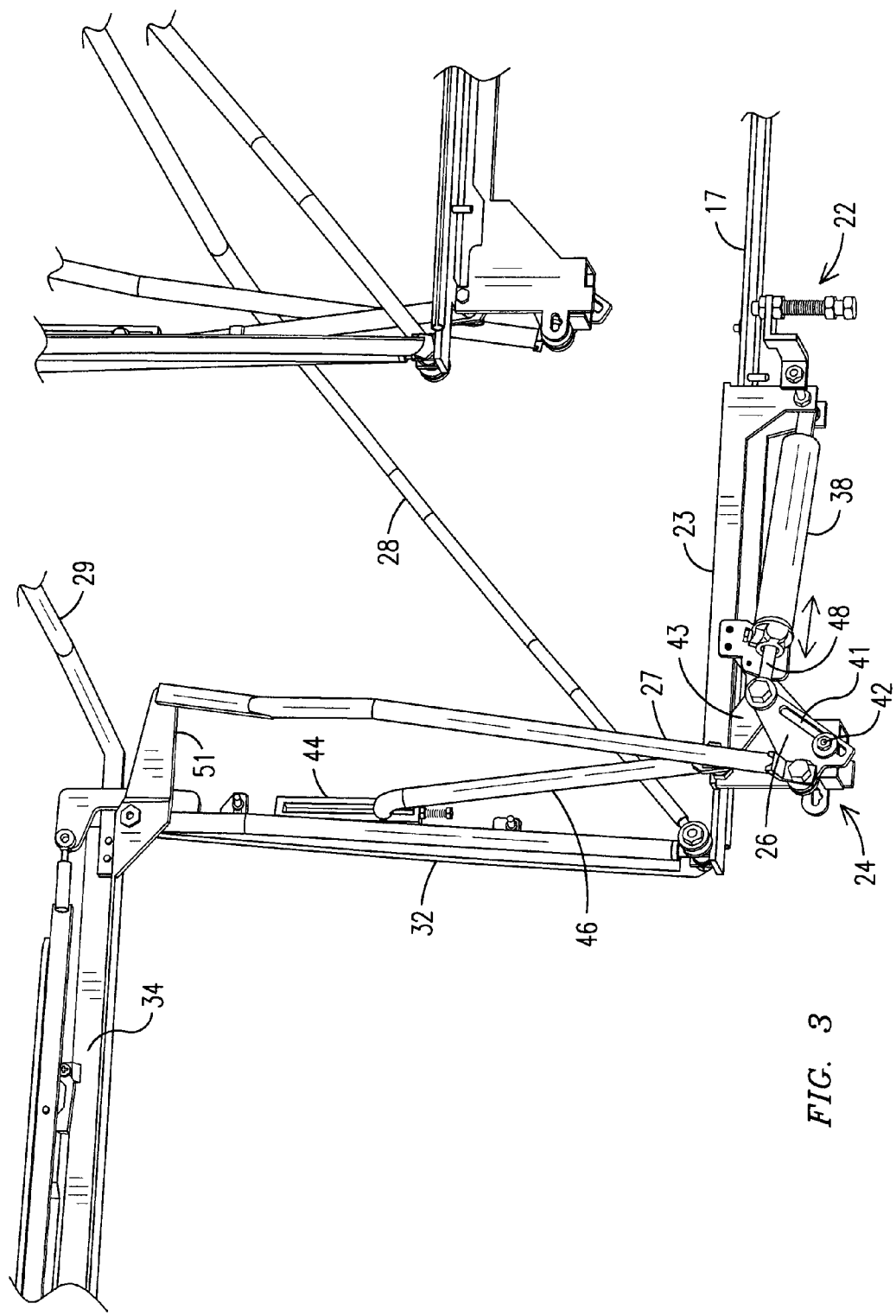
FIG. 3 is an enlarged perspective view of the embodiment of FIG. 2 illustrating a linkage of the frame that facilitates the initial upward deployment and then downward pivoting motion of the top.

FIGS. 3-6 illustrate from various angles the configuration of the primary linkage 24 that facilitates deployment and retraction of the retractable top. One linkage 24 will be described here, but it will be understood that a mirror image linkage of the same configuration is located on the other side of the frame 21 as well. Referring to FIGS. 3-6 in unison, the linkage 24 comprises a generally triangular accelerator plate 26 having an elongated slot 41 within which rides a slip pin 42 that is secured to the shoe 23. The upper end of the accelerator plate 26 is coupled to a link 43 that is pivotally connected at its other end to the shoe 23 by means of a bolt 47. The connection of the link to the accelerator plate forms an elbow 52 and the accelerator plate 26 and link 43 define a scissor jack arrangement. The deployment arm 46 is welded or otherwise fixed at its lower end to the link 43 and extends at an angle with respect thereto. It will thus be seen that rotation of the link 43 about bolt 47 in a counterclockwise direction also rotates the deployment arm 46 in a counterclockwise direction and vice versa. The range of rotation of the link 43 and the deployment arm 46 is such that the deployment arm is rotatable from a generally rearward extending orientation (see FIG. 15) when the top is retracted to a generally upwardly extending orientation as shown in FIG. 3 when the top is deployed. In this regard, a limit switch (not visible) preferably is mounted on the back of a limit switch plate 54 and is adjustable toward and away from the elbow by virtue of a bolt and slot arrangement 55. When the top is fully deployed, the elbow engages the limit switch, which discontinues operation of the actuators and thus ends the deployment process. Similarly, a second limit switch (not shown) is mounted forward of the linkage 24 and is engaged by the elbow to discontinue retraction of the top when the top is fully retracted. The mounting arrangement of the limit switches is not limited to that shown in FIG. 5 and described above and any other mounting arrangement should be construed to be within the scope of the invention.

Figure 4:
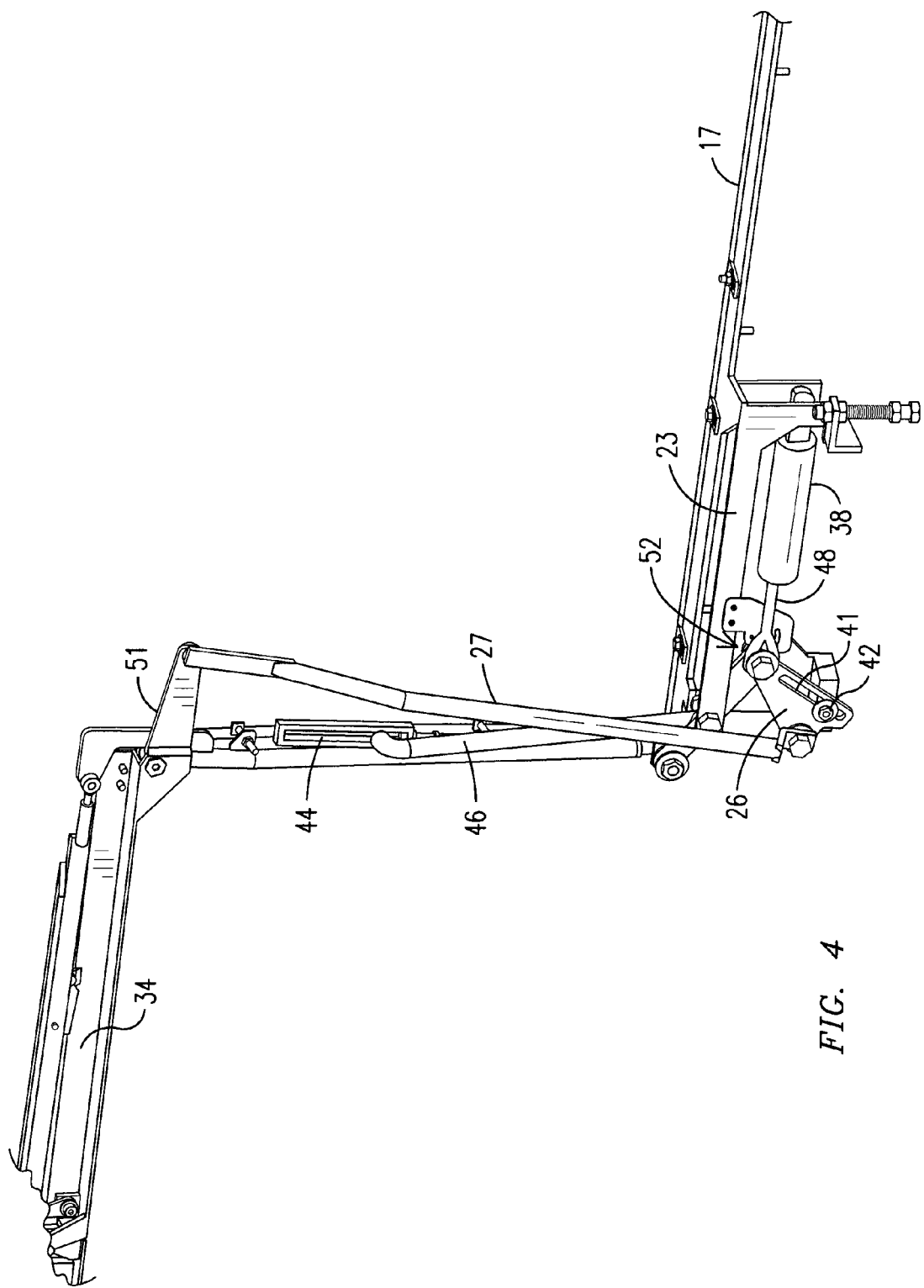
FIG. 4 is an enlarged perspective view of the linkage of FIG. 3 as seen from another angle.
Figure 5:
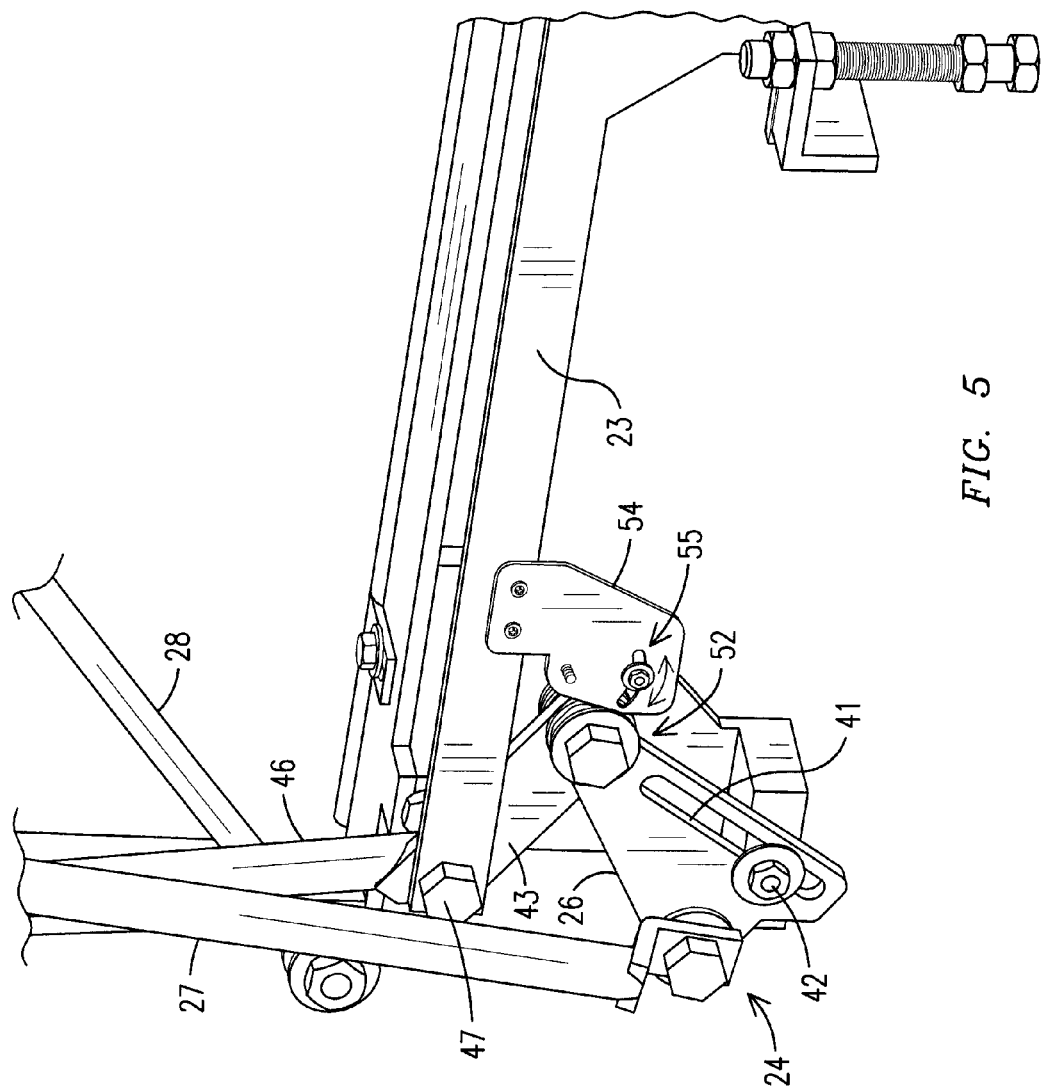
FIG. 5 is a more enlarged perspective of the linkage of FIGS. 3 and 4.
Figure 6:
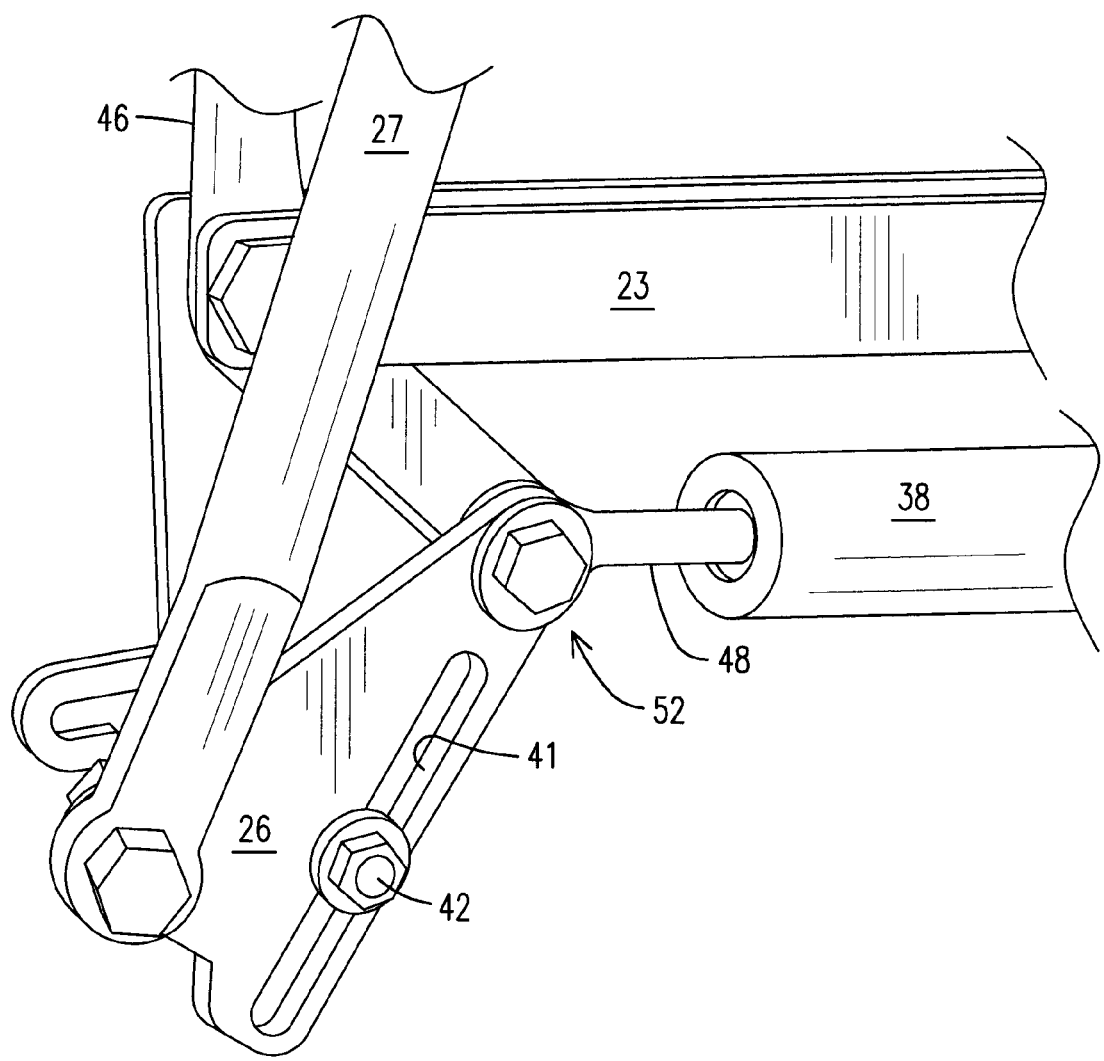
FIG. 6 is a perspective view of the linkage of FIGS. 3, 4, and 5 showing attachment of an optional hydraulic actuator and showing the accelerator plate of the linkage.

As shown in FIGS. 3, 4, and 6, an actuator 38, which is a hydraulic cylinder in this embodiment, has at one end an actuator rod 48 that is selectively extendable and retractable from the body of the actuator upon application of appropriate hydraulic pressure from a conventional hydraulic pump (not shown). The end of the actuator rod 48 is coupled to the elbow at the junction of the accelerator plate 26 and the link 43 and the opposite end of the actuator is fixed to the shoe 23 at its rear end portion. As detailed below, extension of the actuator rod 48 pushes the elbow 52 in a forward direction for retracting the top, and retraction of the actuator rod 48 pulls the elbow 52 in a rearward direction for deploying the top. The actuator also may be arranged either physically or through linkages so that extension of the actuator rod 48 moves the elbow 52 in a rearward direction and retraction of the rod 48 moves the elbow 52 in a forward direction.

A linkage bar 27 is rotatably attached to the accelerator plate 26 on its left side in FIGS. 3-6 and moves from a generally rearward extending orientation when the elbow 52 is pushed to its forward most position (see FIG. 15) to a generally upwardly extending orientation when the elbow 52 is pulled to its rearward most position (FIG. 3). The linkage bar 27 is rotatably attached at its other end to a pivot arm 51 extending from the rear section 34 of the horizontal arm 33 of the frame. In this embodiment, a generally U-shaped fabric support rod 28 is rotatably attached to the forward end of the shoe 23 and extends rearward at an angle to support the fabric cover of the top over the rear compartment of the vehicle. Fabric support rod 29, visible in FIG. 3, is fixed to the back ends of the rear sections 34 of the horizontal arms 33 and also supports the fabric cover just aft of the passenger compartment of the vehicle. As mentioned, other arrangements of support bows are possible.

The sequence shown in FIGS. 7a-7h illustrates the progressive motions of the components of the linkage 24 as the top is deployed from its stowed position to its deployed position covering the open top of the vehicle. In these figures, the actuator rod 48 of the actuator is progressively retracted to move the elbow 52 of the linkage progressively to the right. In FIG. 7a, the top is in its stowed position with the elbow 52 pushed to its forward most position by the actuator. The link 43 and deployment arm 46 are rotated to their most clockwise orientations with the deployment arm 46 extending rearward. The accelerator plate is rotated to its most clockwise orientation and the linkage bar 27 extends rearward. In this configuration, the frame and fabric of the top are folded upon themselves and stowed over the rear compartment of the vehicle.

In FIGS. 7b-7d, the actuator rod 48 is progressively retracted to the right causing the elbow 52 to move to the right, the link 43 to rotate counterclockwise, and the accelerator plate 26 to rotate clockwise. The slot 41 in the accelerator plate 26 facilitates rotation of the accelerator plate as the elbow moves closer and further away from the slip pin 42. As the link 43 rotates, the deployment arm 46 rotates counterclockwise at the same rate from its rearward extending orientation (7a) to its upward extending orientation (7e). During this phase, the frame and fabric of the top are unfolded generally upwardly over the rear compartment of the vehicle (see FIG. 1b). More specifically, the forward and rear sections 34 and 36 are unfolded to form the horizontal arms 33. Significantly, the accelerator plate virtually makes the length of linkage 27 shorter when in the retracted position. This dimension is what controls the timing of the opening of the rails for clearing the door frames of the vehicle. The timing is a function of the angle and placement of the slot 41 in the accelerator plate. If the accelerator plate 26 did not allow for relief (longer) in the forward position, the rails of the top would not have the ability to rotate to their horizontal positions allowing for the top to close on the Jeep® framework.

Beginning with FIG. 7f, the top is substantially completely unfolded over the rear compartment of the vehicle. The continued rotation of the accelerator plate as shown in FIGS. 7g-7h pushes the linkage bar 27 upwardly at a relatively more rapid rate. This, in turn, causes the top to pivot downwardly from its unfolded configuration over the rear compartment of the vehicle to its deployed position covering the passenger compartment and rear compartment of the vehicle (see FIGS. 1c and 1d). The driver can then latch the header of the top to the upper edge of the wind screen to complete the deployment of the top. The top is retracted merely by reversing these steps; i.e. by unlatching the header and causing the actuator to extend the actuator rod 48 back to the position shown in FIG. 7a.

Figure 8:
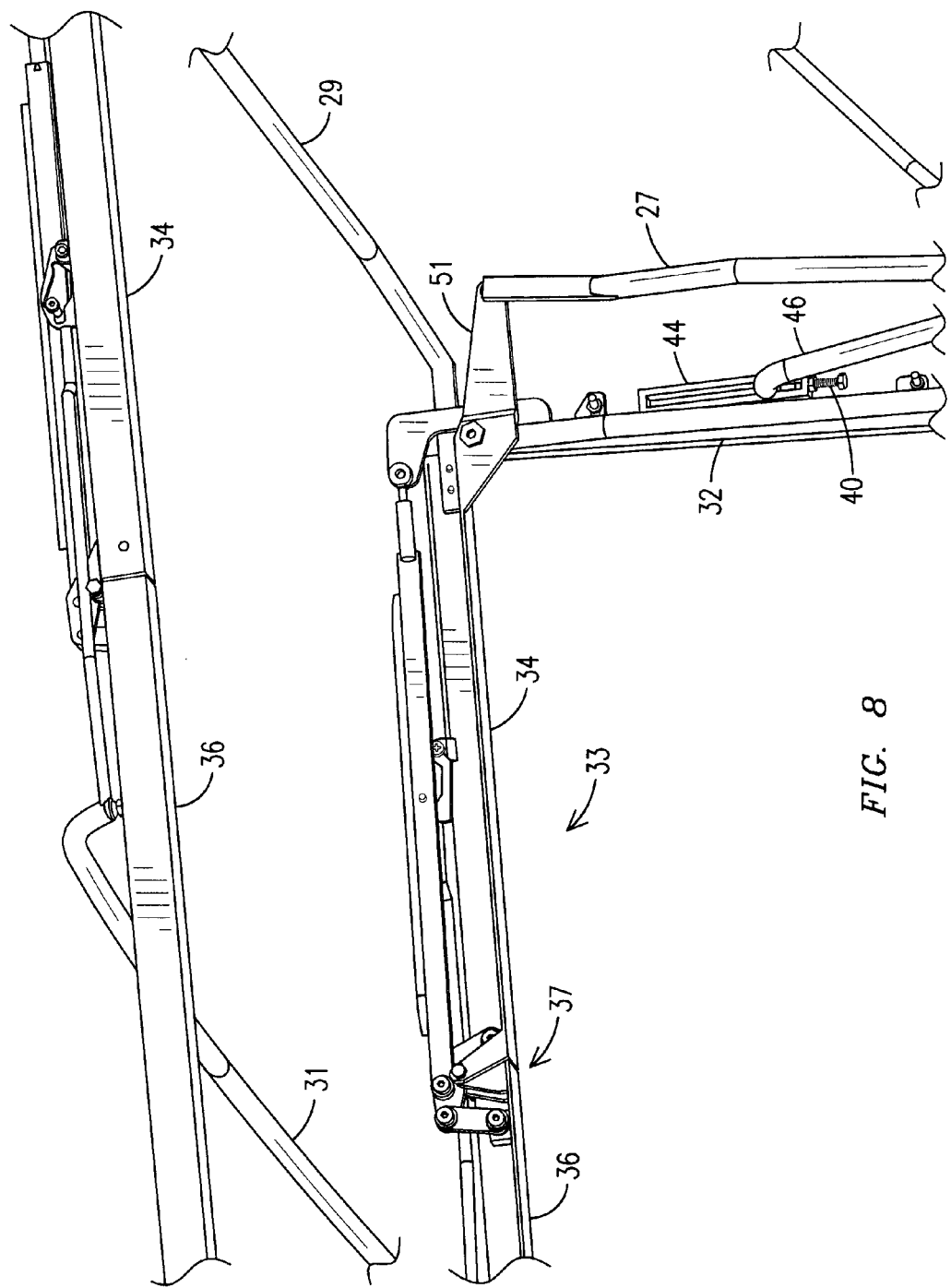
FIG. 8 is a perspective view of a portion of the frame of FIG. 2 illustrating the pivot assembly of the top rails of the frame and other components.
Figure 9:
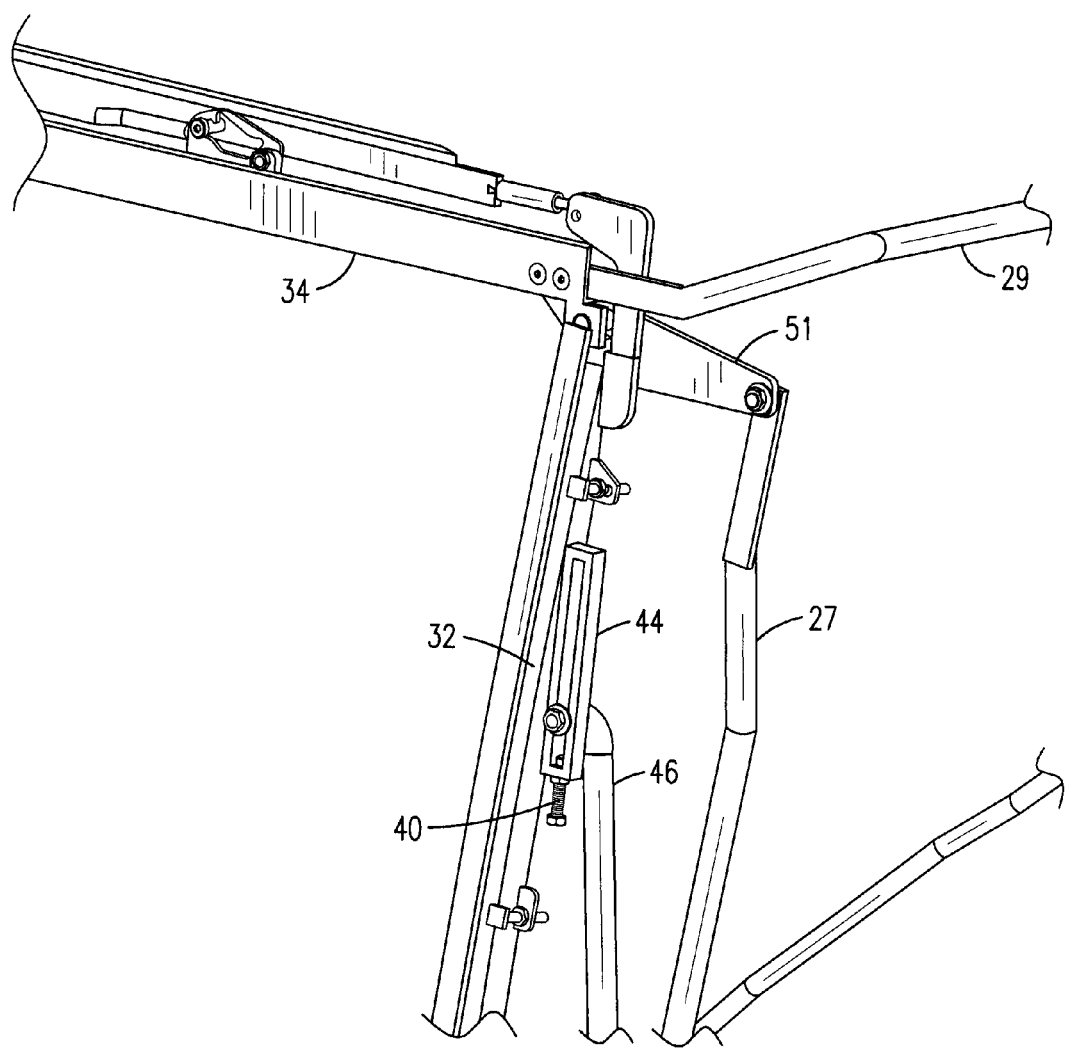
FIG. 9 is a perspective view of the upper rear corner of the deployed frame of FIG. 2 illustrating various components thereof.

FIGS. 8 and 9 show components of the upper portion of the frame of this embodiment including the attachment of the linkage bar 27 to the pivot arm 51, which is a part of the rear section 34 of the horizontal arm 33. Also shown is the coupling of the upper portion of deployment arm 46 to the vertical arm 32. More specifically, the upper portion of the deployment arm 46 includes a slip pin (not visible) that is slidably disposed with an elongated slot of a bracket 44. The slot allows the upper end of the deployment arm 46 to slide downwardly relative to the vertical arm 32 as the top is deployed. An adjustable stop 40 is provided at the bottom of the slot and can be adjusted to limit the motion of the slip pin within the slot and thereby adjust the final position and orientation of vertical arms 32 and the top when deployed. Pivot assembly 37 of this embodiment, described in more detail below, is shown in FIG. 8 at the junction of the rear section 34 and the forward section 36 of the horizontal arm 33. The forward and rear sections fold upon themselves at the location of the pivot assembly when the top is retracted and unfold to form the horizontal arm 33 when the top is deployed.

Figure 10:
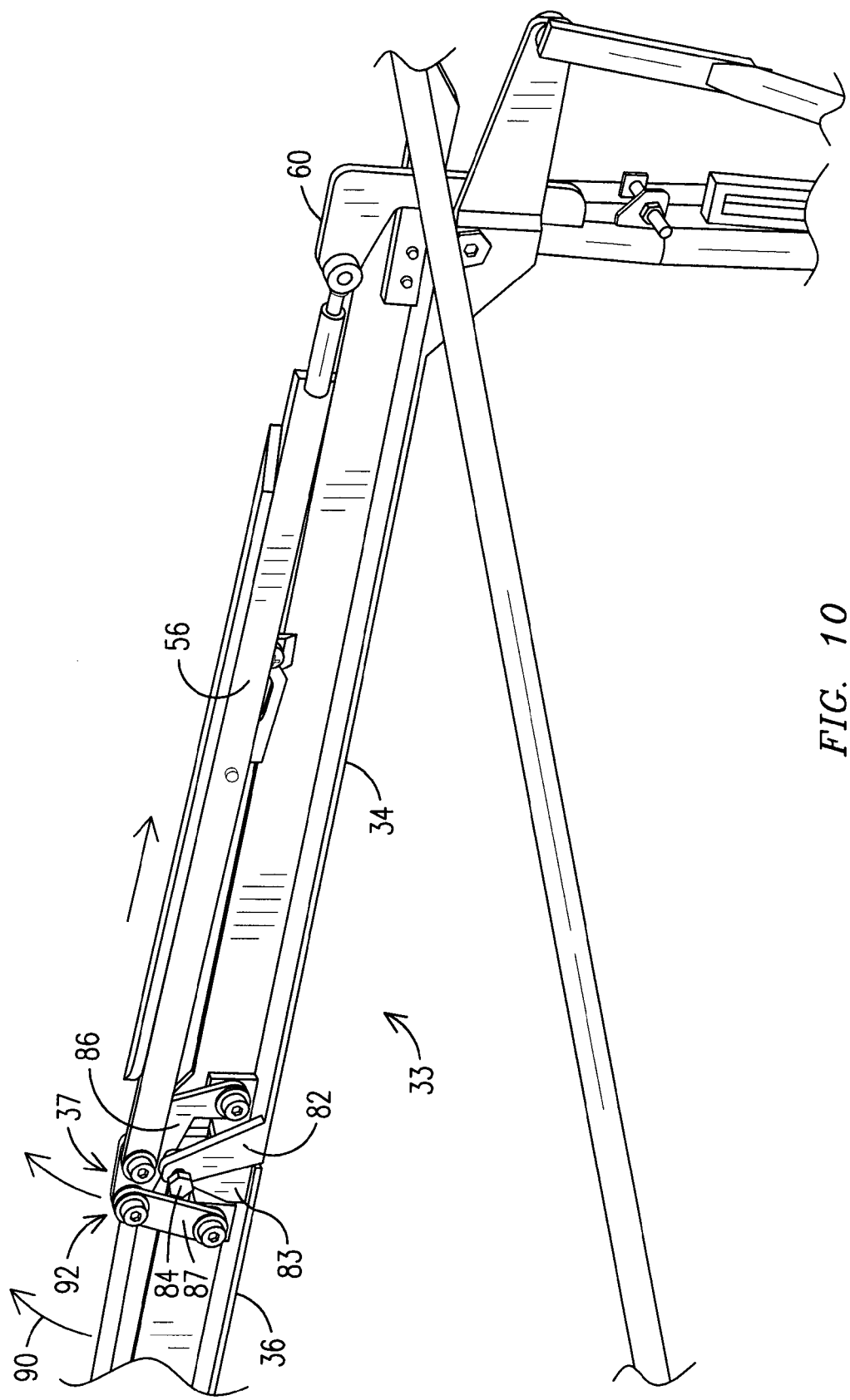
FIG. 10 is a perspective view illustrating a linkage between the upper rear corner of the frame of the embodiment of FIG. 2 and the pivot assembly of the top rails to facilitate folding of the top rails onto themselves.
Figure 11:
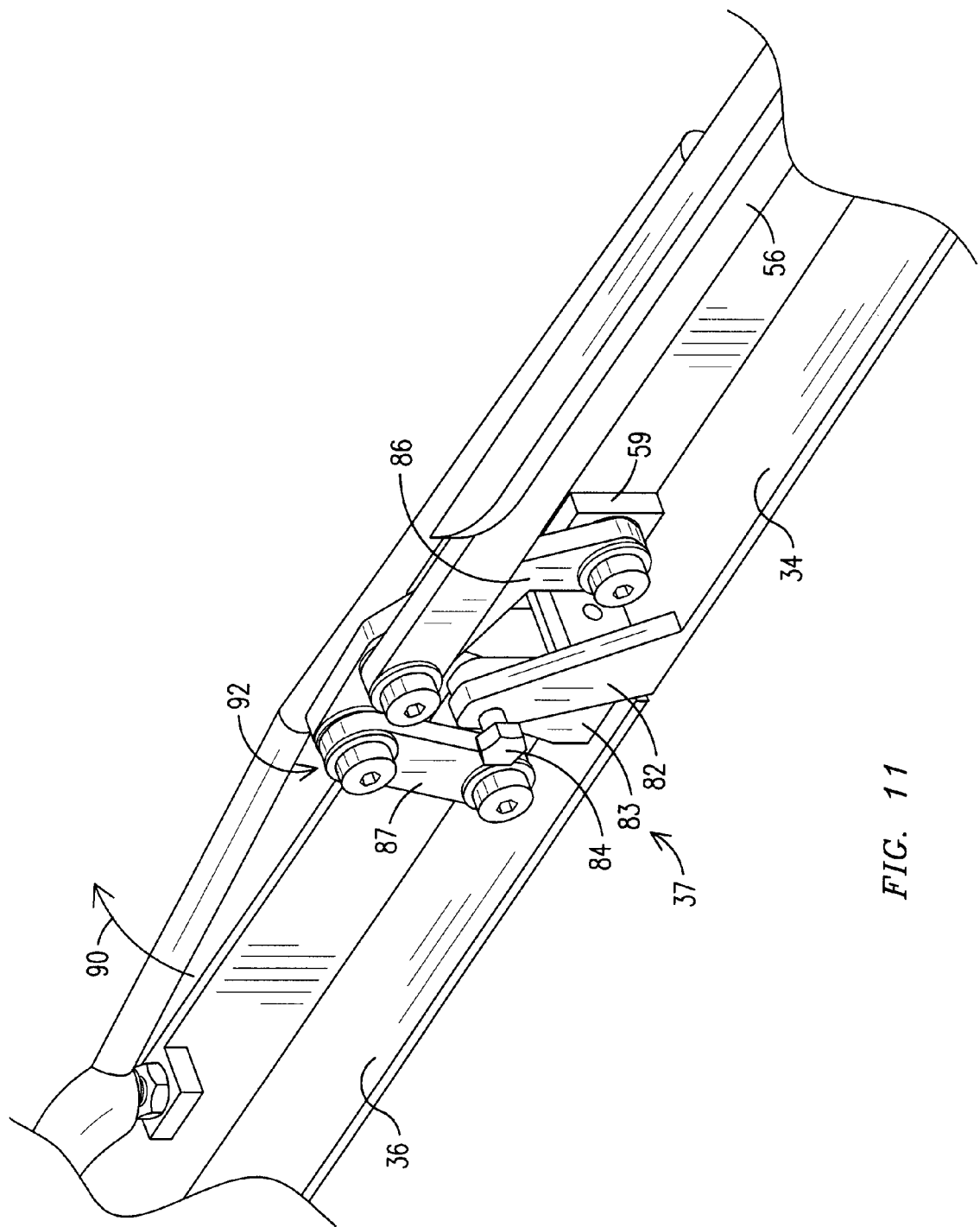
FIG. 11 is an enlarged perspective view of one of the pivot assemblies of the side rails of the frame of FIG. 2 in the deployed configuration of the frame.
Figure 12:
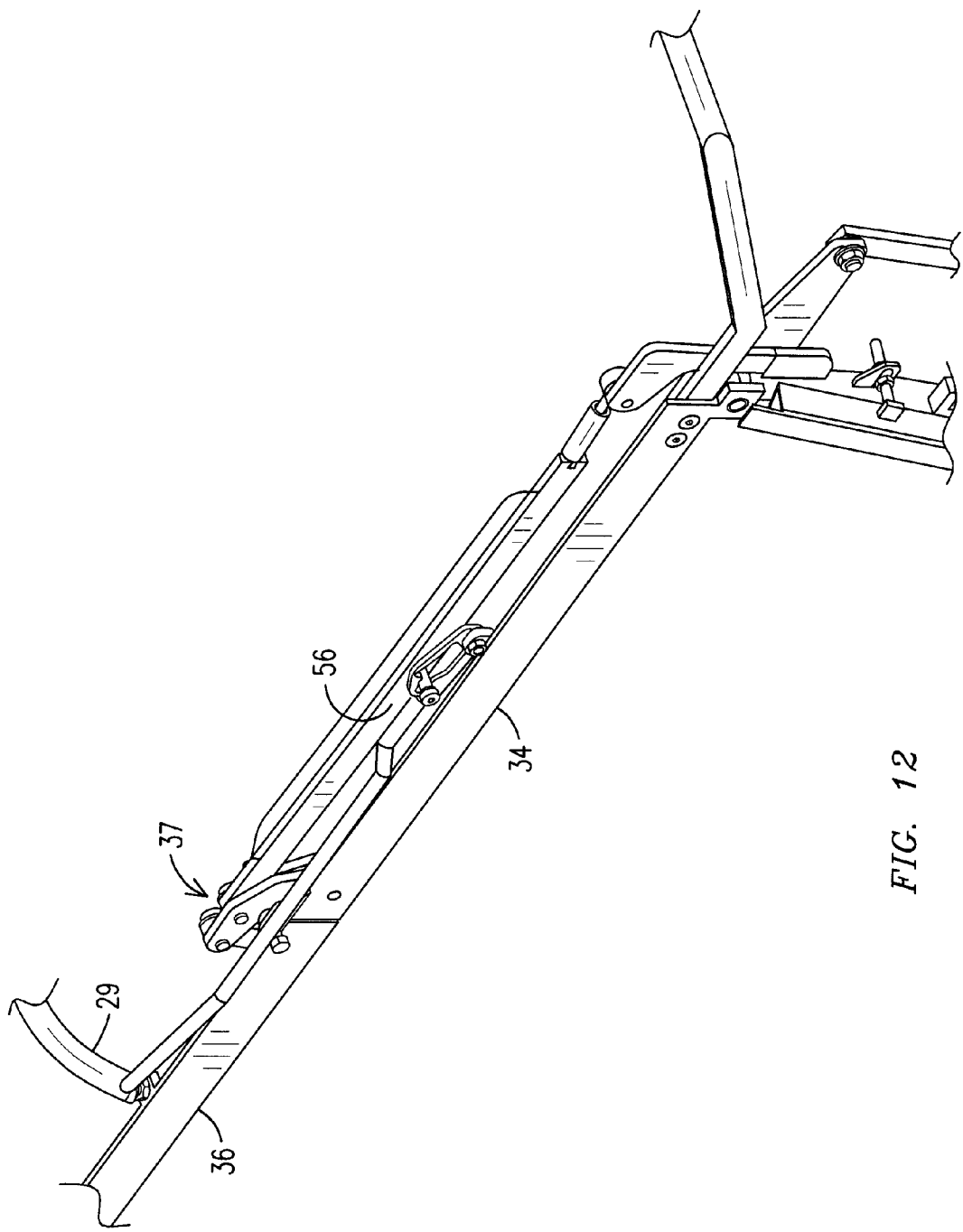
FIG. 12 shows the rear portion of a side rail of FIG. 2 of the frame and illustrates connection of the linking arm to the pivot assembly.

FIGS. 10 through 12 illustrates more clearly the pivot assembly of the horizontal arm 33 about which the rear sections 34 and the forward sections 36 rotate or pivot. The rear and forward sections are pivotally connected together by means of pivot blocks 82 connected to the rear section 34 and pivot blocks 83 connected to forward section 36. The pivot blocks are pivotally connected together by pivot bolts 84. With this arrangement, the forward section 36 can pivot about the axes of the pivot bolts 84 in the direction indicated by arrow 90 until it substantially overlies the rear section 34 in their folded and stowed positions. A first linkage 86 is pivotally connected to the rear section 34 on one side of the pivot blocks and a second linkage 87 is pivotally connected to the forward section 36. The two linkages are pivotally connected together at their ends as indicated at 92. An actuator bar 56 is connected at one end to the linkage 86 as shown and at its other end to bracket 60. As the frame and top are retracted, the actuator bar 56 pulls the linkage 86 rearward, which, through linkage 87, progressively pivots or folds the forward section 36 of the horizontal arm 33 back onto the rear section 34 as the top is retracted.

Figure 13:
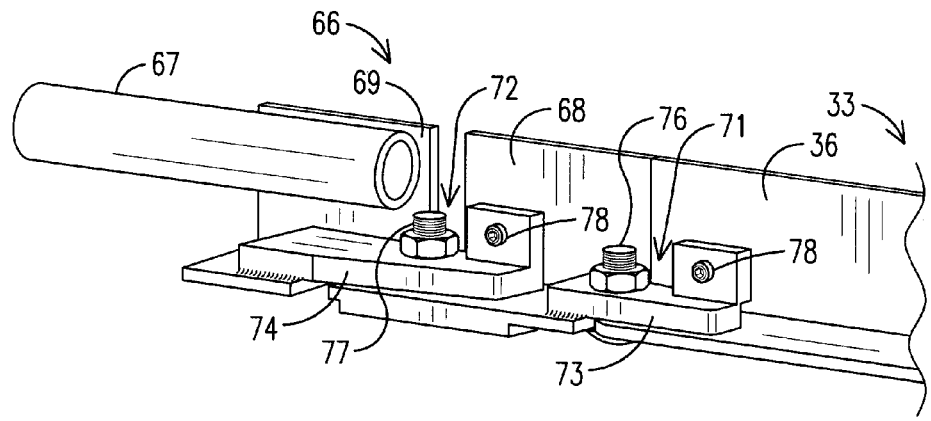
FIG. 13 is a perspective view of the double break hinge assembly and header bar on the forward ends of the side rails of the frame of FIG. 2 to facilitate spreading of the side rails as they move downwardly onto the passenger compartment.
Figure 13A:
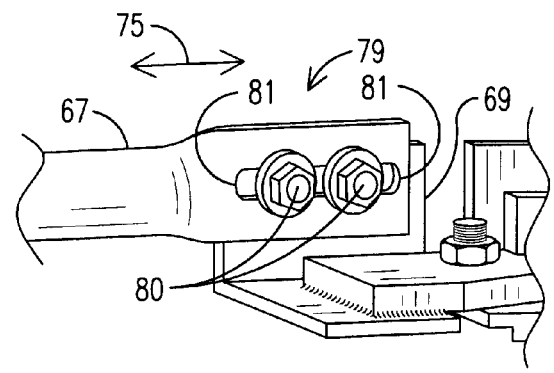
FIG. 13a illustrates an alternate attachment of the header bar to the double brake hinge such that the header bar is adjustable toward and away from the ends of the side rails.
Figure 14:
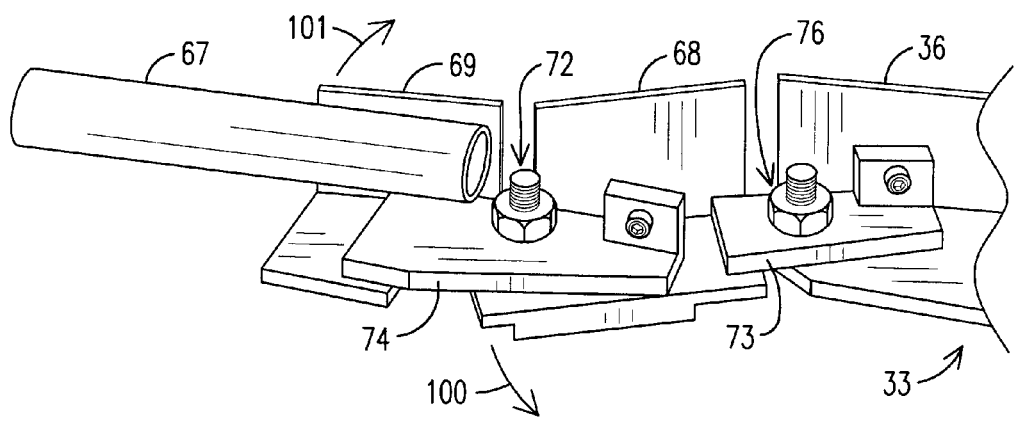
FIG. 14 shows the double break hinge assembly of FIG. 13 in its broken configuration to accommodate spreading of the side rails of the frame during deployment.

FIGS. 13 and 14 illustrate yet another aspect of the retractable top of this invention at the forward ends of the horizontal arms 33. Referring to FIG. 13, a header bar 67 extends from the end of each horizontal arm 33. In the illustrated embodiment, the header bar is welded to the ends of the horizontal arms. It is contemplated, however, that the header bar be adjustably secured to the ends of the horizontal arms to provide fine adjustments of the header with respect to the top edges of a wind screen. For example, the rear ends of the header bar may be pressed flat with elongated attachment slots formed therein. Bolts can extend through the attachment slots and the end of the horizontal arm and be tightened to secure the header bar in place. With such an embodiment, the header bar can be easily adjusted forward and back by virtue of the elongated attachment slots. Preferably, the header bar is sized and configured to receive one end of the factory header of a factory soft top so that an owner can simply remove the header from the factory soft top and install it on the header bars 67.

As mentioned above, the horizontal arms 33 of the top must splay or spread out as the top is lowered onto the passenger compartment in order for the sides of the top to clear the top edges of the doors, roll bars, and perhaps other features of the vehicle. However, the header attached to the front ends of the horizontal arms is a rigid component and cannot accommodate the spreading of the horizontal arms. To address this problem, the inventor has developed a double break hinge assembly shown in FIG. 13. The assembly comprises a first break plate 68 hingedly connected to a fixed end portion of the horizontal arm 33 and a second break plate 69 hingedly connected to the first break plate. The header bar 67 is fixed to the second break plate. More specifically, a rear hinge block 73 is welded or otherwise fixed to the back of the first break plate 68 and extends rearward where it is pivotally connected to the fixed end of the horizontal arm 33 with a pivot bolt 76. Similarly, a second hinge block 74 is welded or otherwise fixed to the second break plate 69 and extends rearward where it is pivotally attached to the first break plate 68 by means of a pivot bolt 77. Thus, the first break plate can pivot inwardly and outwardly with respect to the fixed end of the horizontal arm and the second break plate can pivot inwardly and outwardly with respect to the first break plate 68. Adjustable stops 78 are provided as shown to ensure that the horizontal arm 44, first break plate 68, and second break plate 69 are aligned with each other when pivoted against the stops 78.

FIG. 14 illustrates the function of the double break hinge when the horizontal arm spreads out to accommodate features of the vehicle as it moves downwardly onto the vehicle. When this occurs, the first break plate 68 pivots inwardly as indicated by arrow 100 and the second break plate 69 pivots outwardly as indicated by arrow 101. The ultimate result is that the horizontal arms 33 are able to splay or spread outwardly as needed and the header bars remain the same distance apart and substantially parallel to remain attached to the rigid header. When the top moves fully down onto the tops of the doors, the horizontal arms move back toward one another to form a seal around the top edges of the doors and, consequently, the double break hinge moves back to its normal configuration as shown in FIG. 13. Thus the spreading and narrowing of the horizontal arms of the top is fully accommodated.

Figure 15:
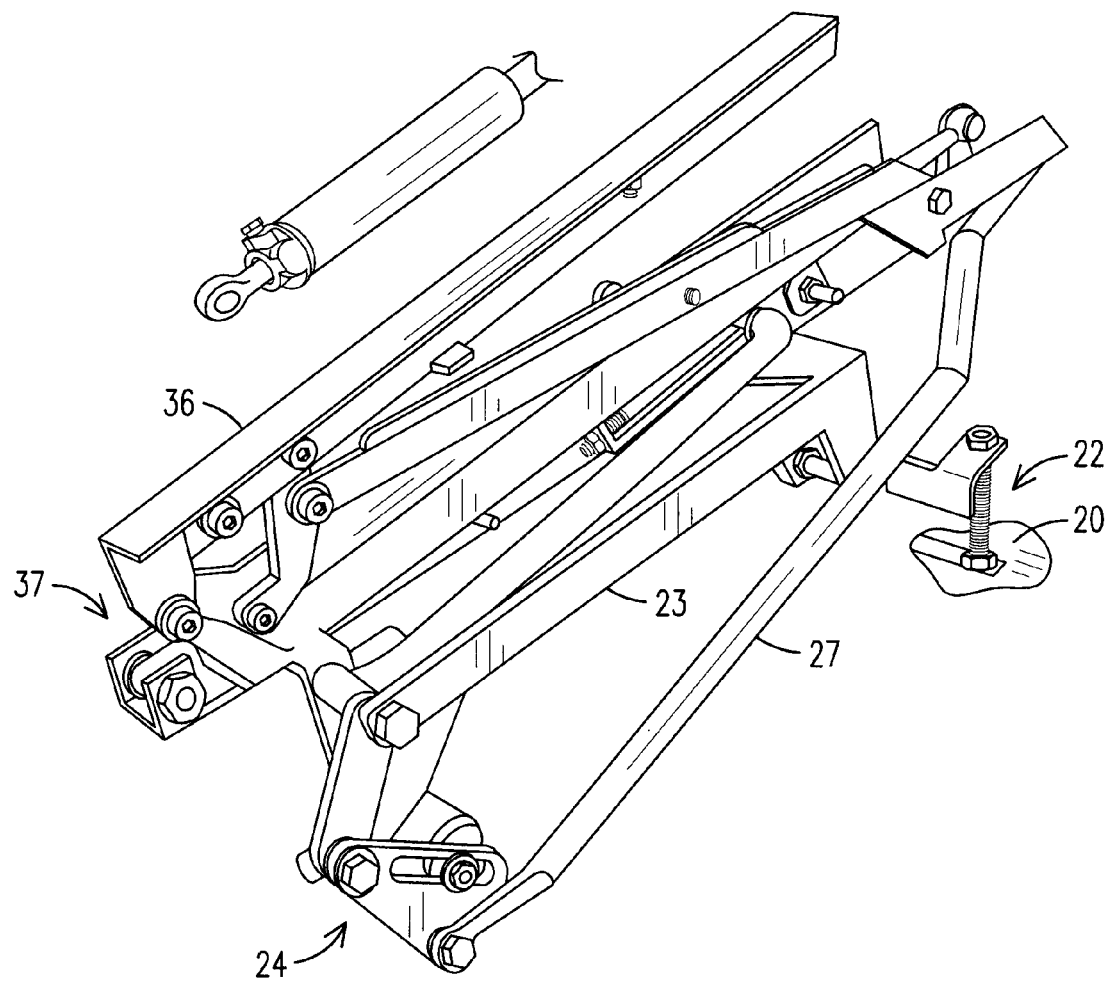
FIG. 15 is a perspective view of one side of the frame of FIG. 2 in its fully retracted and stowed configuration.
Figure 16:
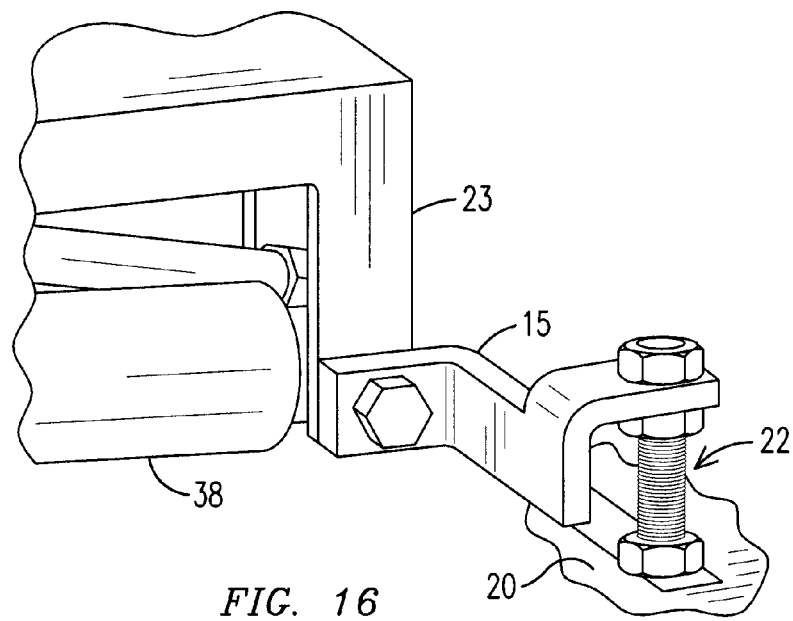
FIG. 16 is a perspective view of the support and adjustment bracket that secures the frame assembly to the rear wheel well of the vehicle to provide rigid support and to permit fine adjustment of the top.

FIG. 15 shows one side of the frame of the top in its fully retracted configuration as it appears when retracted onto the rear compartment of a vehicle. The components fold onto each other in a relatively flat configuration. As mentioned above, an adjustable support bracket 22 projects inwardly from the rear of the shoe 23 and carries a bolt that is fixed to the inside wheel well 20 of the vehicle. The support bracket provides sufficient support for the assembly, and also allows minute adjustments in the position of the top when it is deployed. FIG. 16 is an enlarged image of the support bracket 22 showing the bolt attached to bracket arm 15 that is fixed to the rear end of the shoe 23. The bolt, in turn, is fixed to the interior wheel well of the vehicle and can be adjusted up or down to make fine adjustments to the position and orientation of the frame assembly. The location on the wheel well where the bolt of the support bracket attaches is structurally stronger and in a different horizontal plane than is the belt rail of the vehicle. This triangulation of attachment points (along the belt rail and to the wheel well) greatly increases the rigidity and structural integrity of the base plates and consequently the entire top assembly.

Figure 17:
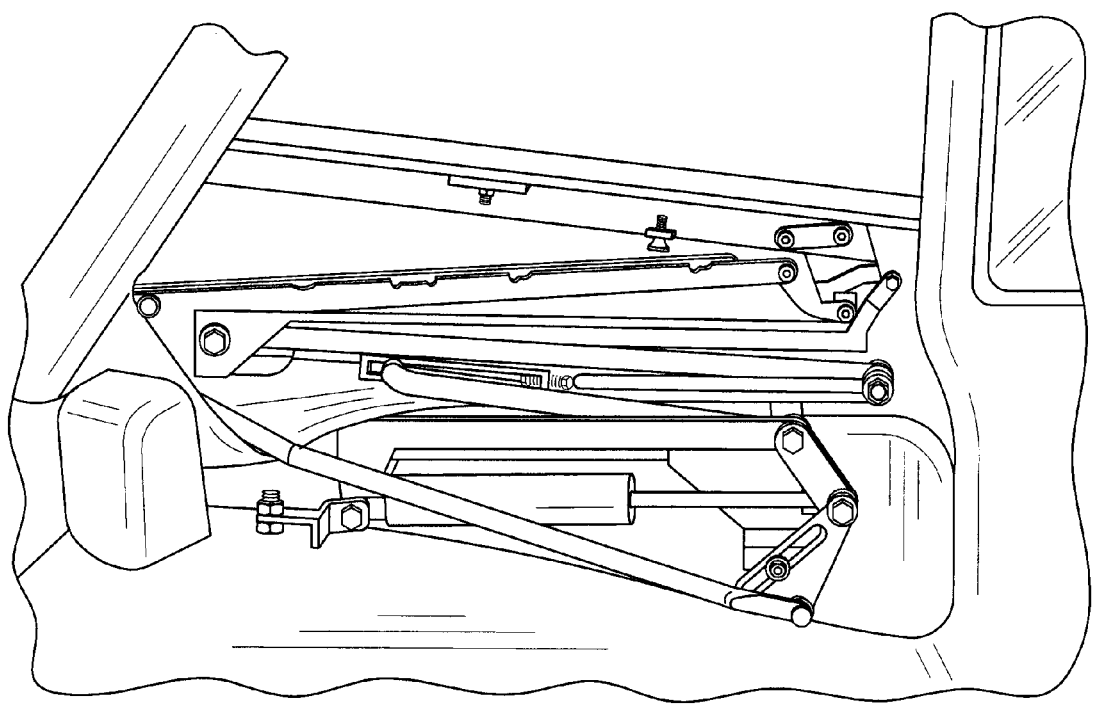
FIG. 17 illustrates one side of the frame of the top of FIG. 2 in its stowed configuration mounted within a vehicle.

FIG. 17 shows one side of the frame of the retractable top mounted within a Jeep® Wrangler® vehicle and in its fully retracted configuration. The actuator is fully extended and the components of the frame are folded onto each other in a relatively compact configuration.

Figure 18:
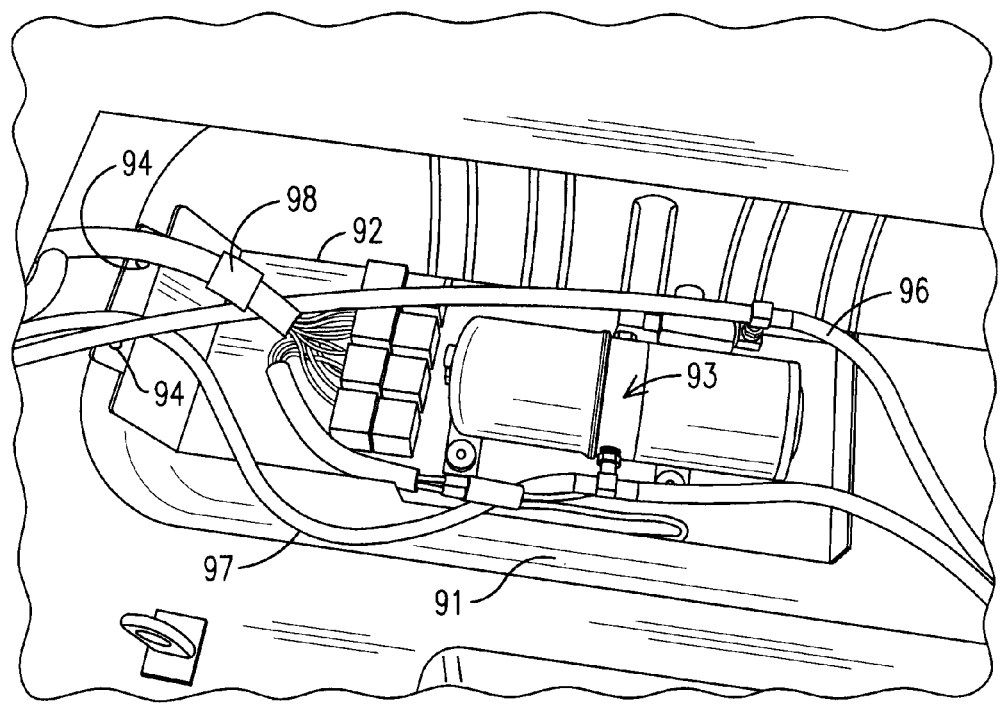
FIG. 18 is a perspective view illustrating a preferred installation of a hydraulic pump in the cargo compartment of a Jeep® brand off-road vehicle.

FIG. 18 illustrates a preferred arrangement for mounting a hydraulic pump in a Jeep® brand vehicle for supplying hydraulic fluid to the cylinders that deploy and retract the top. The hydraulic pump and motor assembly 83 is secured to a metal bracket 92. The bracket 92 is formed with ears on its ends that are shaped to rest at the ends of the cargo well 91, where it is secured with screws 94. Hydraulic hoses 96 and 97 extend from the pump to the two hydraulic cylinders for extending and retracting the cylinders in the known manner. A wiring harness 98 carries wiring and relays that, among other things, supply power to operate the hydraulic pump selectively from a switch in the passenger compartment. The power supply circuit is also coupled to the brake light wiring of the vehicle in such a way that the pump will not operate unless power is being supplied to the break lights. In this way, it is ensured that the power top cannot readily be deployed or retracted while the vehicle is moving. The bracket 92 positions the hydraulic pump and motor 93 within the existing cargo well of the vehicle so that in normal operation, it is covered and out of sight by the rear cargo cover of the vehicle.

Figure 19:
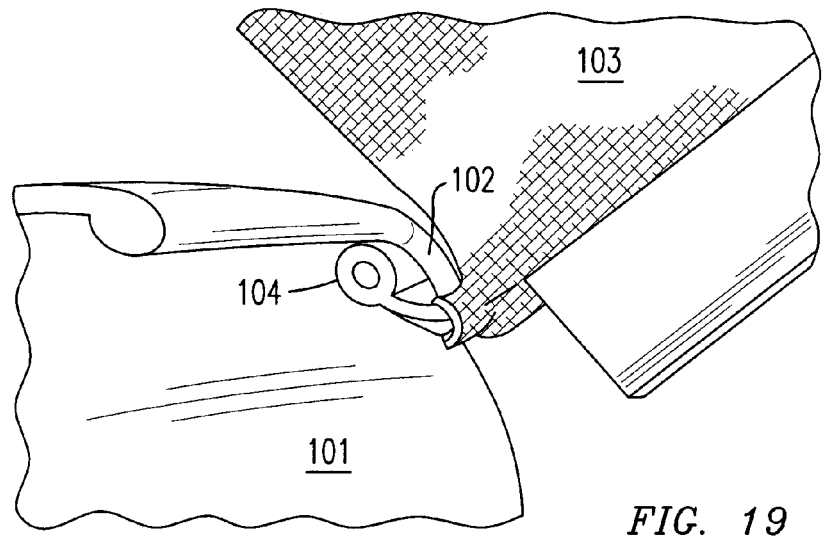
FIG. 19 illustrates the extruded P-spline along the lower back edge of the canvas of the top fitting into the tub channel of a Jeep® brand off-road vehicle.

FIG. 19 illustrates a preferred method and device for attaching the bottom rear edge of the fabric of the top to the top edge of the rear tub of a Jeep® brand vehicle such as a Wrangler® model vehicle. The body 101 of the vehicle at the rear of the vehicle is factory configured with a metal P-channel 102 that extends around the top of the rear tub. According to the present invention, a rubberized P-spline 104 has one edge attached to the lower back or rear edge of the fabric 103 of the top and a free edge that is shaped with an enlarged bulb. To attach the lower back edge of the fabric 103, the bulb of the P-spline is slid progressively into the P-channel until the fabric is properly positioned. The bulb of the P-spline thus holds the lower back edge of the fabric securely to the vehicle.

Figure 20:
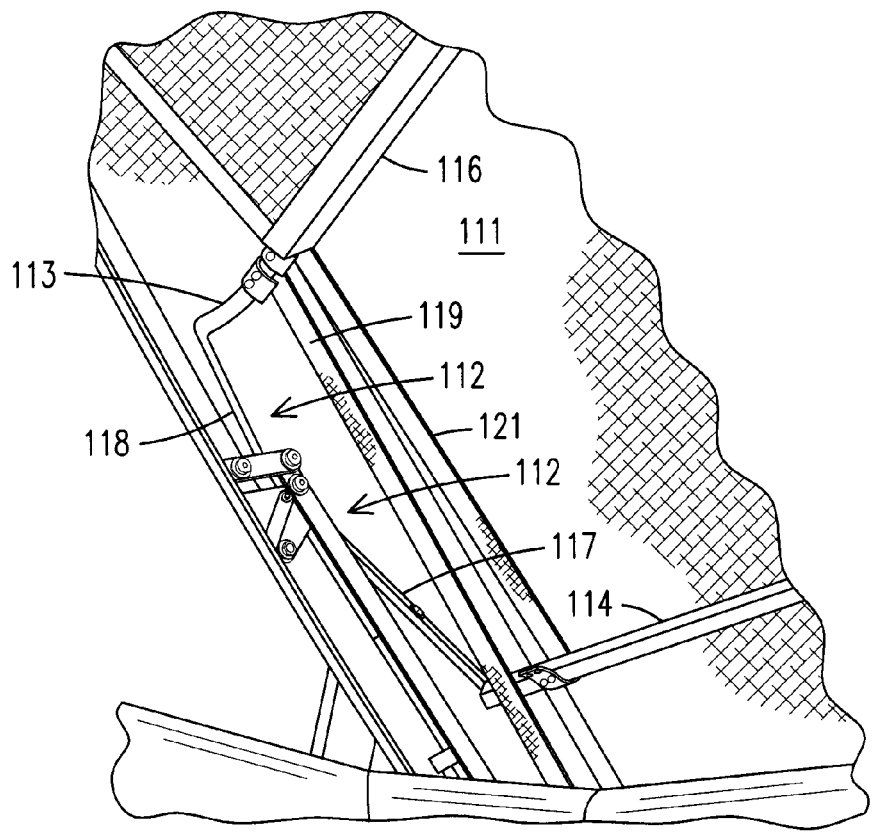
FIG. 20 is a perspective view from beneath the fabric of the top of this invention showing another embodiment of support bows and elastic straps for supporting the fabric top.

FIG. 20 is a perspective view from the bottom of a partially deployed top of this invention illustrating an alternate arrangement of support bows that support the fabric of the top when deployed. This arrangement of support bows has been found to prevent the pooling of water on the fabric during a rain, and thus is a preferred embodiment. The top is shown in FIG. 20 almost fully deployed with its horizontal arm assemblies 112 substantially unfolded and the fabric 111 of the top stretched taught atop the frame of the top. A rear support bow 168 (FIG. 27), not visible in FIG. 20, is attached at the rear ends of the horizontal arms and engages and may support the top edge of the fabric at the back of the passenger compartment when the top is deployed. A drop bow 28 (FIG. 2) also is present for supporting the fabric above the rear compartment, but is not visible in FIG. 20. A forward support bow 113 is pivotally attached to the horizontal arms of the frame by respective attachment bars so that the forward bow 113 is free to pivot upwardly about the attachment points against the fabric 111 of the top. Conversely, the forward bow 113 can pivot downwardly during retraction and storage of the top. Preferably, the forward support bow 113 is secured to the fabric of the top by means of a Velcro® strap 116 that wraps around the bow 113.

Figure 27:
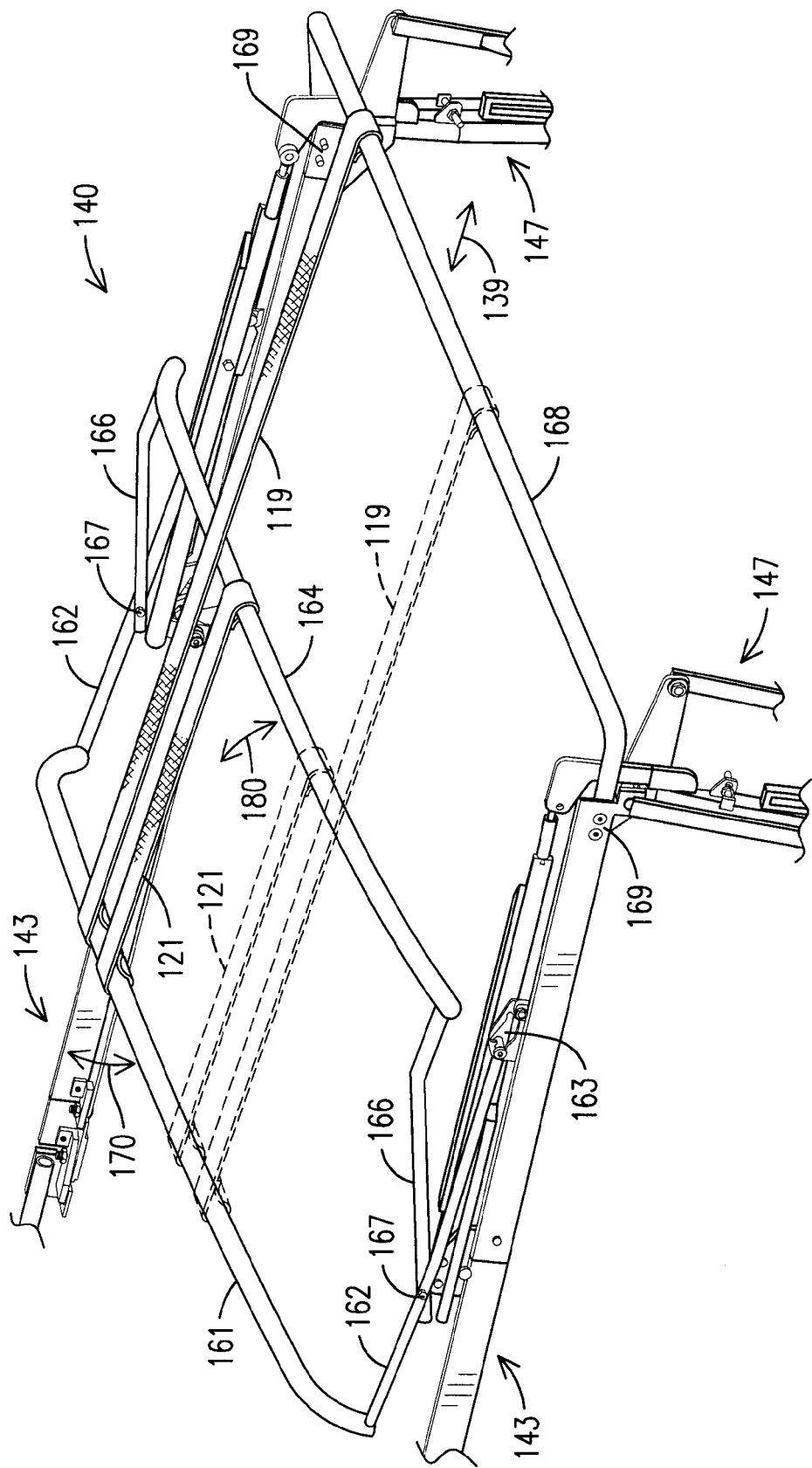
FIG. 27 is a perspective view of the top portion of the deployed frame showing the three support bows that support the fabric top.

An intermediate support bow 114 is pivotally attached by respective attachment bars 117 to the attachment bars 118 of the forward support bow 113. Thus, the intermediate support bow 114 is free to pivot upwardly about its attachment points against the underside of the fabric 11. It also can pivot downwardly to a more compact position when the top is retracted and folded into the rear storage compartment of the vehicle. A first pair of elastic straps 119 (only one is visible in FIG. 20) each is secured at one end to the forward support bow 113 and at its opposite end to the rear support bow 168 (FIG. 27). A second pair of elastic straps 121 (only one is visible in FIG. 20) each is secured at one end to the forward support bow 113 and at its opposite end to the intermediate support bow 114. The pairs of elastic straps 119 and 121 are sized so that as the horizontal arms of the frame unfold, the forward support bow is pulled upwardly as the elastic straps 119 are pulled tight and stretch. Concurrently, the intermediate support bow 114 is pulled upwardly as the elastic strap 121 is pulled tight and stretched. In this way, both of the support bows 114 and 116 are continuously maintained in firm contact with the underside of the fabric 11 to support the fabric, keep it tightly stretched from side-to-side across the top of the vehicle, and prevent sagging that can result in undesirable pooling of water during rain. When the top is retracted, the tight and stretched elastic straps tend to pull the top upwardly when it is unfastened from the wind screen. Among other things, this reduces the load on the actuators. As detailed below, the "drop" support bow over the rear compartment is selectively adjustable so that the fabric of the deployed top is pulled tight over the rear compartment when the top is deployed.

Figure 21:
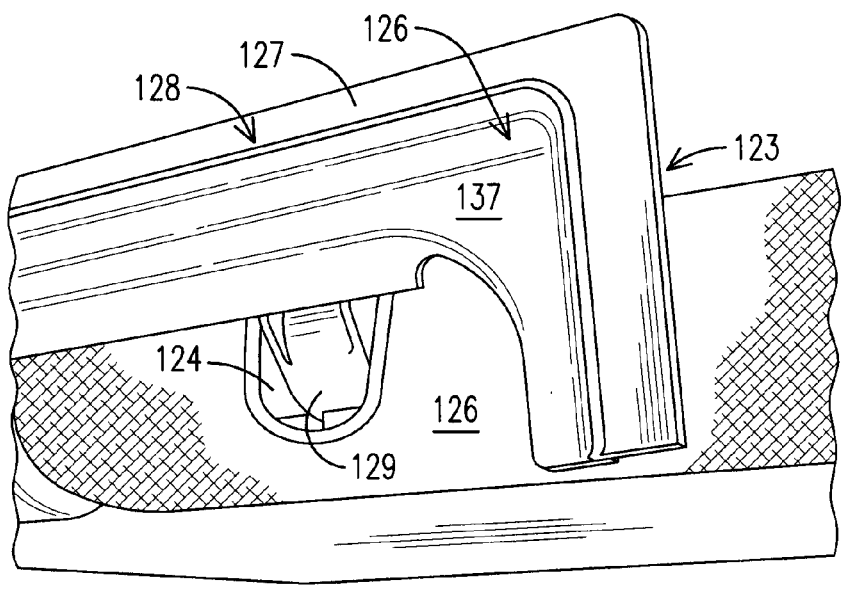
FIG. 21 shows a section of a door surround according to the invention in which the edge of the fabric resides when the top is deployed to form a substantial seal.

FIG. 21 illustrates a door surround according to the invention that replaces the factory door surround of a Jeep® brand vehicle to accommodate the deployed top of this invention. FIG. 21 shows the rear portion only of the door surround, but it will be understood that the surround on each side of the vehicle extends forward over the tops of the rear and forward doors and the doors close against the door surrounds. With more specific reference to FIG. 21, the vehicle is provided on each side with a roll bar 124 that typically is covered with a soft fabric or foam cover 126. An opening in the cover accommodates the mounting bracket 129 of the replacement door surround 126, which replaces the factory door surround as mentioned. The replacement door surround is formed with a surface 137 against which the top edge portions of the doors of the vehicle rest when closed. An edge track 128 is formed along the outer peripheral portion of the door surround 126 and the upper surface of the edge track 128 defines an elongated groove or trough. A peripheral flange 127 extends outwardly from the location of the edge track. The trough and the peripheral flange function to receive the side edges of the fabric of the top when the top is deployed to secure the side edges and form a drain for rainwater that flows to the side edges of the top. Preferably, a metal cable is incorporated into the side edges of the fabric and is pulled tight when the top deploys. The tightly stretched cable extends along the trough of the edge track 128 to secure the edge of the fabric securely against the door surround. Preferably, the cable is tensioned by a spring at one end to accommodate changes due to temperature, wear, etc. The attachment point of the spring also may be adjusted according to the invention to ensure that the cable remains tight over time.

Figure 22:
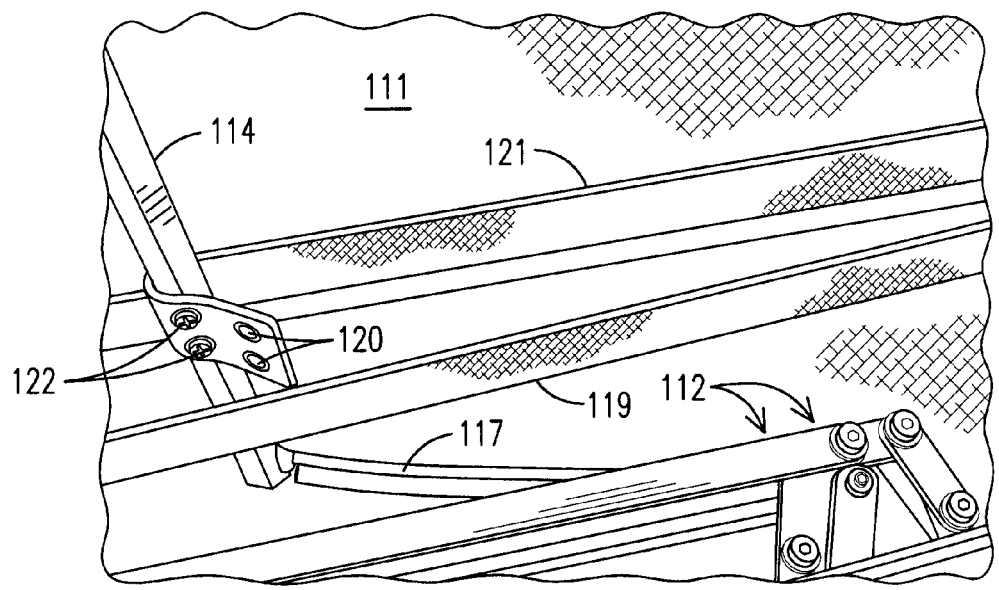
FIG. 22 is an enlarged view of one of the support bows and the elastic straps that hold the bars up against the underside of the fabric when the top is deployed.

FIG. 22 is an enlarged portion of the underside of the deployed top of this invention showing one method of attaching the ends of the elastic straps 119 and 121 to respective support bows 114. The strap 121 extends over the top of and wraps partially around the support bow 114. The end of the strap 121 is provided with spaced apart pairs of grommets 120. The end of the strap is fastened to the support bow 114 by screws 122 that extend through a selected pair of grommets and are threaded into the support bow. Two or more spaced pairs of grommets preferably are provided so that the tension in the elastic straps can be adjusted by selecting a different pair of grommets to use in fastening the ends of a strap to their respective support bows.

Figure 23:
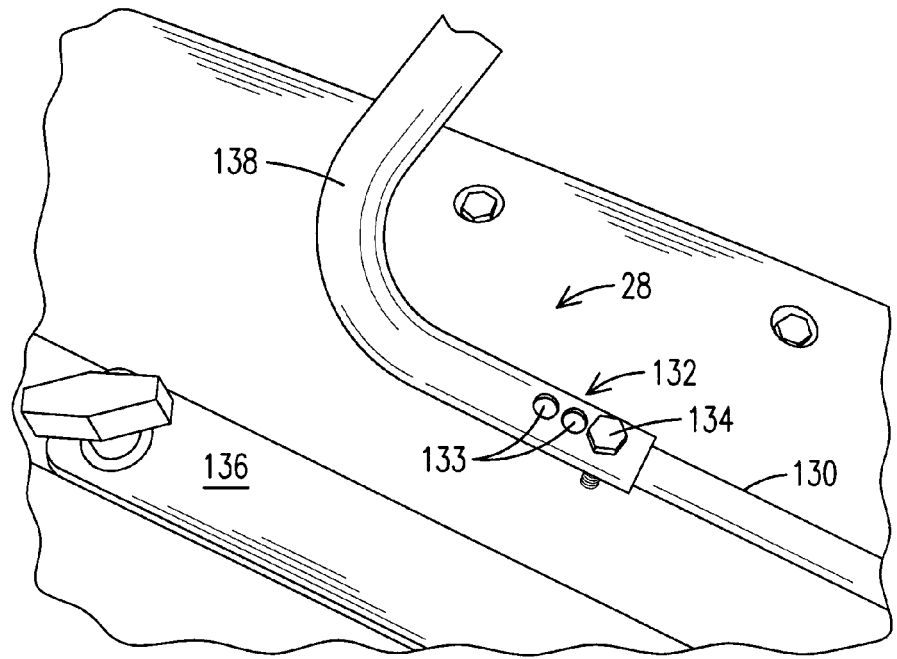
FIG. 23 illustrates the main support bow and shows how the bar can be adjusted in length to ensure that the fabric top is kept taught when deployed.

FIG. 23 shows the adjustment feature of the "drop" support bow 28 (FIG. 2) that supports the fabric cover over the rear compartment of a vehicle. The bow 28 includes an attachment arm 130 to which a cross bar 138 is telescopically secured and attached with a bolt 134. The cross bar 138 is provided with an array of spaced attachment holes 133 to accommodate the bolt 134 and the attachment arm 13 may have one or more holes that align with a selected set of holes 133 for receiving the bolt. In this way, the amount of projection of the cross bar 138 from its attachment point to the frame of the top can be adjusted as needed to ensure that the fabric of the top remains tightly stretched over the deployed frame over the rear compartment of the vehicle.

Figure 24:
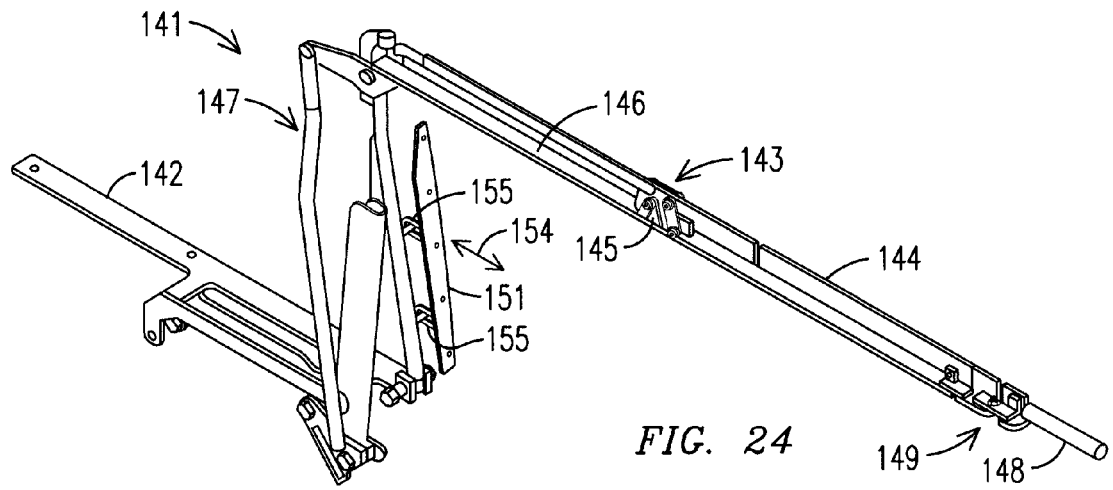
FIG. 24 illustrates an embodiment of one of the two frame members of the top.

FIG. 24 is a perspective view of one of the two frame members 141 of the power top shown here in its deployed configuration. The frame member 141 has comprises a base 142 that mounts to the top of the cargo rail at the back of a Jeep® brand vehicle and to the wheel well as described above. A vertical arm assembly 147 is pivotally attached to the base 142 and extends upwardly in a substantially vertical orientation as shown when deployed. A side bracket 151 is adjustably mounted to the vertical arm assembly 147 and can be adjusted as indicated by arrow 154 by means of bolt and slot arrangements 156. The adjustability of the side bracket allows for pulling the rear side portions of the fabric tight when the top is deployed and also permits adjustment of a door bracket to be attached to the side bracket, as detailed in more detail below. Horizontal arm assembly 143 is attached to the upper end of the vertical arm assembly 147 and is shown with its forward section 144 fully unfolded at pivot assembly 145 so that the rear section 146 and forward section 144 assume a straight horizontal configuration. The horizontal arm assembly 143 terminates in header bar 148 that is attached to the forward section 144 by means of the double brake hinge assembly 149, which functions as detailed above to allow the horizontal arm assembly to spread slightly during deployment.

Figure 25:
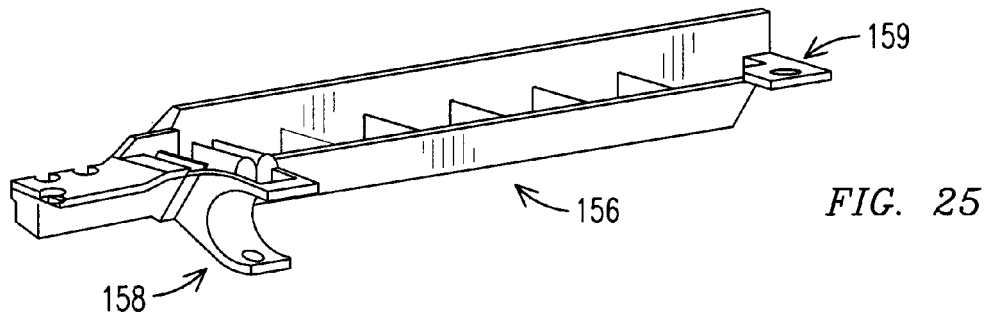
FIG. 25 illustrates the door surround that replaces a factory door surround on a Jeep® brand off-road vehicle during installation of the top.

FIG. 25 illustrates one of the two forward sections of the door surround assembly. Each forward section attaches to the side roll bars at bracket 158 and to the top corner of the windscreen. The rear sections of the door surrounds (FIG. 21) extend from the back of the rear doors to the B pillar between the doors and the front sections extend from the B pillar to the upper corners of the windscreen. The two sections then define the top portion of a door surround for both front and rear doors of the vehicle. Further, the trough 128 (FIG. 21) extends along both forward and rear sections of the door surround to receive edges of the fabric and the tensioned cables therein.

Figure 26:
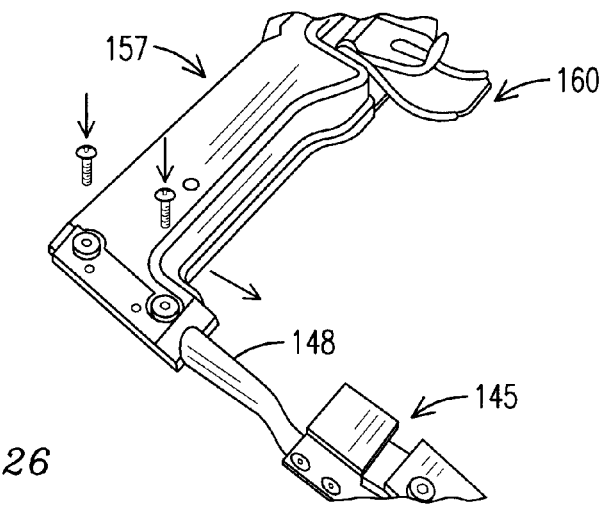
FIG. 26 illustrates attachment of the original factory soft top header to the header bars at the forward edges of the frame members of the top.

FIG. 26 illustrates attachment of a factory header previously removed from the factory soft top to the header bars at the front ends of the horizontal arms of the frame. The factory header extends along the top of the windscreen when the top is deployed and is securely fastened thereto by means of locking clips 160 on the header. The header bars 148 mimic those of the factory soft top such that the factory header 157 can simply be slid onto the bars 148 and fastened with screws as shown. The forward edge of the fabric of the top is clamped into the factor header and is pulled tight by the header as the top is deployed.

FIG. 27 is a perspective view of the frame of the top without the fabric cover and illustrates perhaps better the various functional components thereof. The frame 143 of this embodiment comprises vertical arm assemblies 147 and horizontal arm assemblies 143 as previously described. The rear support bow 168 is secured with bolts 169 to the rear end of the horizontal arms of the frame. A drop bow 28 (FIG. 2) is hinged to the forward ends of the base plates and floats with the fabric cover during deployment and retraction as described above. The drop bow 28 can be adjusted as described above with reference to FIG. 23. The rear support bow adds to the rigidity and stability of the frame and may bear somewhat against the underside of the fabric of the top at the junction of the top and back portions of the fabric. Forward support bow 161 is shown pivotally attached by means of attachment rods 162 to the horizontal arm assembly 143 at 163. Thus, the forward support bow is able to pivot up and down about attachments 163 in the directions indicated by arrow 170. Intermediate support bow 164, in turn, is pivotally attached by means of attachment rods 166 to the attachment rods 162 of the forward support bow. Thus, the intermediate support bow 164 is able to pivot up and down about attachments 167 in the directions indicated by arrow 180.

As described above, elastic straps are used to pull the forward and intermediate support bows firmly against the underside of the fabric of the top when the top is deployed. They thereby help pull the fabric tight and shape the span of the fabric into a slight arch from one side to the other side of the vehicle. More specifically, a pair of longer elastic straps 119 is attached at their ends to the rear support bow 168 and the forward support bow 161. When the top is deployed, these longer elastic straps cause the forward support bow to be pulled upwardly against the underside of the fabric. Similarly, shorter elastic straps 121 are attached at their ends to the forward support bow and the intermediate support bow 164 as shown. These straps are sized so that as the forward support bow is pulled upwardly by the longer straps 119, the intermediate support bow 164 is pulled upwardly against the underside of the fabric by straps 121. As a result, the fabric of the top is firmly supported and shaped into a slight arch by the bows, the bows adjust automatically to any stretching or shrinkage of the fabric, and water pooling on the top of the fabric is eliminated. The straps also assist initial retraction of the top as mentioned above.

Figure 28:
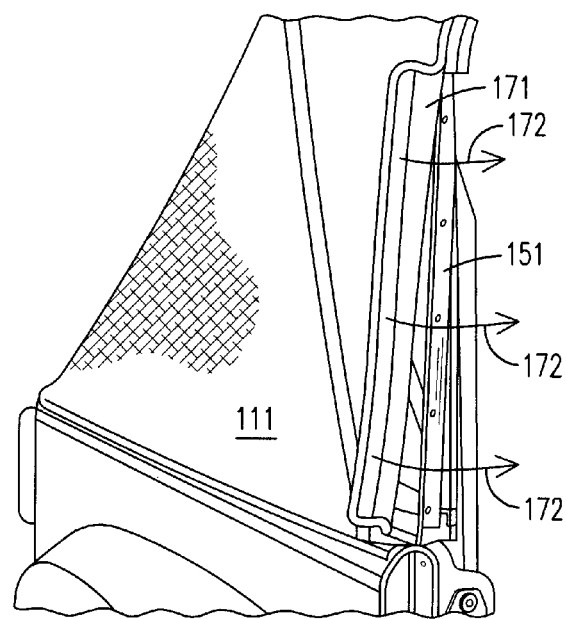
FIGS. 28 and 29 illustrate attachment of the fabric of the top to the side bracket of the frame with a door bracket secured to the side bracket capturing the fabric.
Figure 29:
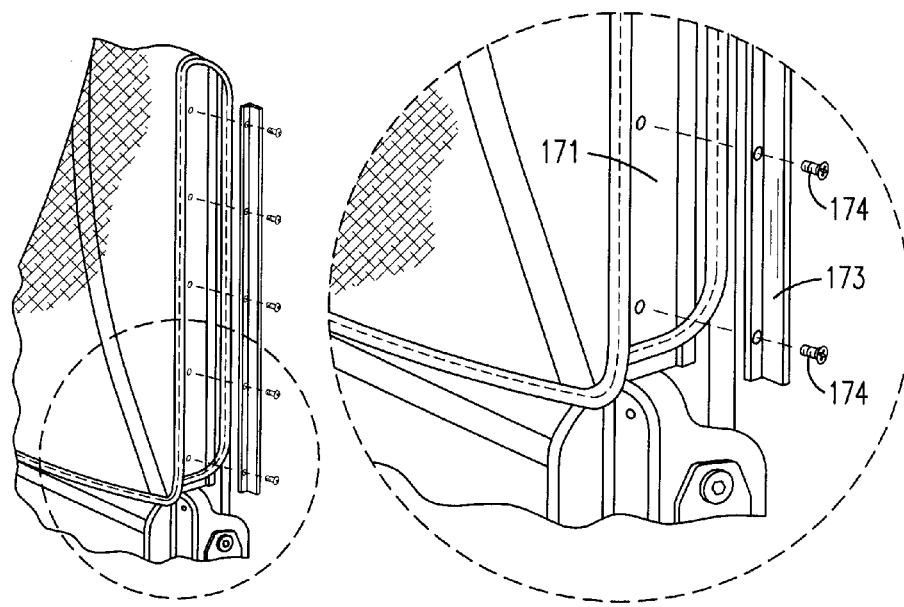

FIGS. 28 and 29 illustrate attachment of the fabric of the top to the side plates 151 of the frame. The fabric is formed with a flap 171 that folds over and is pulled taught around the side plates 151 on either side of the vehicle as indicated by arrows 172 in FIG. 28. Referring to FIG. 29, once the fabric flap 171 is pulled onto the side plate, a door bracket 173 is secured to the side plate atop the fabric flap by means of screws 174. This secures the fabric flaps to the side plates and the door brackets form stops against which the rear doors of the vehicle close. In this regard, once the door brackets are fastened to the side plates, the side plates can be adjusted as shown in FIG. 24 to align the door brackets properly with the rear edges of the back doors. A resilient seal can then be applied to the door brackets to form a tight seal and lessen wind noise inside the vehicle.

The invention has been described herein in terms of preferred embodiments and methodologies considered by the inventor to represent the best modes of carrying out the inventions and discoveries disclosed herein. It will be understood by the skilled artisan, however, that many additions, deletions, and modifications, both subtle and gross, might well be made to the illustrated embodiments without departing from the spirit and scope of the invention disclosed herein.

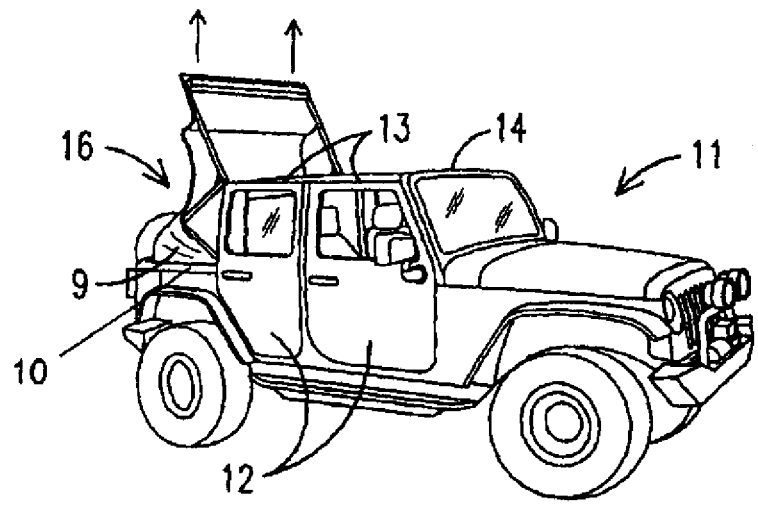

What is claimed is:

1. A soft top for an off-road vehicle that has a rear compartment bounded on sides of the rear compartment by belt rails and a passenger compartment forward of the rear compartment, the soft top being attachable to the vehicle and, when attached, selectively movable between a retracted configuration folded on itself and overlying the rear compartment of the vehicle and a deployed configuration unfolded and covering the rear compartment and the passenger compartment, the soft top comprising:
   a frame comprising:
      a pair of base plates each attachable to a respective one of the belt rails;
      a pair of vertical arms each pivotally attached at a forward end of a respective one of the base plates and extending to a distal end;
      a pair of rear sections each pivotally attached at the distal end of a respective one of the vertical arm members and extending to a distal end;
      a pair of forward sections each pivotally attached at the distal end of a respective one of the rear sections and extending to a distal end;
      each rear section and forward section being substantially collinear to define horizontal arms when the soft top is in the deployed configuration;
      a header extending between the distal ends of the pair of forward sections and being attachable to the wind screen of the off road vehicle when the soft top is in the deployed configuration; and
      support bows extending between the horizontal arm member;
   a fabric cover supported by the frame over the rear compartment and passenger compartment when the soft top is in the deployed configuration and being folded upon itself when the soft top is in the retracted configuration; and
   a deployment mechanism interconnecting the vertical arms, the rear sections of the horizontal arm members and the forward sections of the horizontal arm members, the deployment mechanism being configured to unfold the soft top in a substantially vertical direction over the rear compartment of the vehicle and subsequently to pivot the unfolded soft top downwardly to the deployed configuration covering the passenger and rear compartments.

2. A soft top for an off-road vehicle as claimed in claim 1 further comprising a support bracket and post assembly fixed to each of the base plates and being configured to attach to a respective wheel well of an off-road vehicle at a position inwardly spaced from the adjacent belt rail to stabilize the frame.

3. A soft top for an off-road vehicle as claimed in claim 2 wherein the support bracket and post assembly is selectively adjustable when attached to a wheel well for adjustment of the position of the soft top when in the deployed configuration.

4. A soft top for an off-road vehicle as claimed in claim 3 wherein the post is threaded and sized to extend through a hole in the wheel well and further comprising a pair of nuts on the post for securing the post to the wheel well, the nuts being selectively positionable along the threaded post to provide for adjustment of the support bracket and post assembly.

5. A soft top for an off-road vehicle as claimed in claim 1 wherein the deployment mechanism comprises:
   a pair of linkages coupled to the forward ends of the base plates and being movable between extended configurations and retracted configurations relative to the base plates; and
   a pair of deployment arms each fixed at one end to one of the linkages and slidably coupled at an opposite end to the corresponding vertical arm;
   the deployment arms being rotated as a consequence of movement of the linkages to urge the vertical arms to pivot from a rearwardly extending stowed orientation to an upright orientation relative to the base plate upon deployment of the soft top.

6. A soft top for an off-road vehicle as claimed in claim 5 further comprising a slotted block fixed to each of the vertical arms, the opposite ends of the deployment arms comprising pivot pins that ride within the slots of the slotted blocks as the deployment arms urge the vertical arms between their stowed orientations and their upright orientations.

7. A soft top for an off-road vehicle as claimed in claim 6 further comprising set screws at lower ends of the slots and being selectively adjustable to limit the sliding motion of the slip pins within the slots and thereby adjust the orientation of the vertical arms when in their upright orientations so that the soft top is properly positioned when deployed.

8. A soft top for an off-road vehicle as claimed in claim 5 wherein each linkage comprises a link pivotally attached at one end to the base plate, an accelerator plate pivotally attached at one end to the base plate at a location spaced from the attachment of the link, the link and the accelerator plate being pivotally coupled together at their opposite ends at an elbow, movement of the elbows of the linkages causing the link and the accelerator plate to pivot about their attachments to the base plate, the deployment arms being fixed to the links.

9. A soft top for an off-road vehicle as claimed in claim 8 wherein the accelerator plates comprise slots and further comprising slip pins attached to the base plate extending through the slots of the accelerator plates, the accelerator plates pivoting about the slip pins as the slip pins ride along the slots upon movement of the elbow.

10. A soft top for an off-road vehicle as claimed in claim 9 further comprising a pair of pivot arms fixed to the rear sections of the horizontal arms and extending rearwardly of the pivotal attachment of the rear sections to the vertical arms and a pair of linkage bars each pivotally coupled at one end to a respective accelerator plate at a location spaced from the elbow and the slip pin and pivotally coupled at an opposite end to a respective pivot arms, the linkage bars pivoting the rear sections of the horizontal arms to their deployed positions relative to the vertical arms upon movement of the elbow and consequent pivoting movement of the accelerator plates.

11. A soft top for an off-road vehicle as claimed in claim 10 further comprising a pivot assembly pivotally connecting the rear section of each horizontal arm to the forward section of each horizontal arm, the pivot assemblies configured to allow the forward sections of the horizontal arms to pivot with respect to each other from their collinear positions to stowed positions generally folded onto one another.

12. A soft top for an off-road vehicle as claimed in claim 11 further comprising a bracket attached to each of the vertical arms extending away from the opposite ends thereof and a pair of actuator bars each pivotally attached at one end to a respective one of the brackets and pivotally attached at an opposite end to a respective one of the pivot assemblies, the actuator bars causing the forward and rear sections of the horizontal arms to pivot between their stowed positions and their collinear positions as the soft top is deployed.

13. A soft top for an off-road vehicle as claimed in claim 1 further comprising a pair of header bars at the distal ends of the forward sections of the horizontal arms, the header being attached at opposite ends to the header bars and being secured along a length of the header to the fabric cover.

14. A soft top for an off-road vehicle as claimed in claim 13 further comprising a pair of double brake hinges each coupling one of the header bars to a respective one of the forward sections of the horizontal arms, the double break hinges being configured to permit the horizontal arms to spread away from each other during deployment of the soft top while the spacing between the header bars remains substantially the same.

15. A soft top for an off-road vehicle as claimed in claim 1 further comprising a pair of side brackets adjustably secured to each of the vertical arms, the fabric cover being secured to the side brackets at a rear of the passenger compartment.

16. A soft top for an off-road vehicle as claimed in claim 15 further comprising a pair of door brackets attached to the adjustable side brackets and having surfaces against which a door of the off-road vehicle closes, adjustment of the side brackets adjusting the positions of the door brackets relative to the doors of the off-road vehicle.

17. A soft top for an off-road vehicle as claimed in claim 1 wherein the fabric cover has rear edges and further comprising P-splines attached along the rear edges of the fabric top, the P-splines being configured to fit within corresponding P-channels extending around the rear tub of an off-road vehicle to hold the rear edges of the fabric cover to the vehicle.

18. A soft top for an off-road vehicle as claimed in claim 1 wherein the fabric cover has side edges and further comprising cables fixed to and extending along the side edges of the fabric cover, the cables being tensioned when the soft top is deployed to secure the side edges of the fabric cover.

19. A soft top for an off-road vehicle as claimed in claim 18 further comprising a spring attaching at least one end of each cable to the frame to tension the cables when the soft top is deployed.

20. A soft top for an off-road vehicle as claimed in claim 18 further comprising door surrounds mountable to the off-road vehicle along the sides of the passenger compartment, the door surrounds being formed with channels that receive the side edges of the fabric cover when the cover is deployed.

21. A soft top for an off-road vehicle as claimed in claim 1 wherein the support bows comprise a forward support bow attached for movement toward and away from the horizontal arms, a rear support bow attached at rear ends of the horizontal arms, and an intermediate support bow between the forward and rear support bows attached for movement toward and away from the horizontal arms and a mechanism for moving at least the forward and intermediate support bows away from the horizontal arms when the soft top is deployed to tension the fabric cover.

22. A soft top for an off-road vehicle as claimed in claim 21 wherein the rear support bow is adjustably attached to the rear ends of the horizontal arms for adjusting the tension applied by the rear support bow to the fabric cover.

23. A soft top for an off-road vehicle as claimed in claim 21 wherein the mechanism for moving comprises straps connected to the support bows.

24. A soft top for an off-road vehicle as claimed in claim 23 wherein the forward support bow is pivotally connected by attachment rods to the horizontal arms and the intermediate support bow is pivotally connected to by attachment rods to the attachment rods of the horizontal arms, the straps comprising a first strap connected between the rear support bow and the forward support bow and a second strap connected between the forward support bow and the intermediate support bow.

25. A soft top for an off-road vehicle as claimed in claim 8 further comprising a pair of extendable and retractable actuators each attached at one end to the base plate and at an opposite end to the elbow of a corresponding linkage, the actuator selectively moving the elbow to deploy and retract the soft top.

26. A soft top for an off-road vehicle as claimed in claim 25 wherein the actuator is a hydraulic cylinder.

27. A retractable top comprising a frame attachable to the belt rail and the rear wheel wells of an off-road vehicle having a rear compartment and a passenger compartment, and a fabric cover supported by the frame, the frame including pivot points and linkages that cooperate to deploy the retractable top first upwardly over the rear compartment and then pivot it downwardly over the passenger compartment of the vehicle.

28. The retractable top of claim 27 wherein the linkages include an accelerator plate.

29. The retractable top of claim 27 and wherein the linkages include a double breaking hinge.

30. The retractable top of claim 27 and wherein the linkages include a pivot assembly.

31. A method of deploying a retractable top from a retracted position folded over a rear compartment of an off-road vehicle to a deployed position covering the rear compartment and a passenger compartment of the off-road vehicle, the method comprising the steps of:
  (a) progressively unfolding the retractable top in a substantially vertical direction over the rear compartment of the off-road vehicle;
  (b) when the retractable top is substantially completely unfolded, rotating the retractable top downwardly over the passenger compartment of the vehicle; and
  (c) attaching a forward edge of the retractable top to a top edge of a windscreen of the off-road vehicle;
  the header bars being adjustable with respect to the distal ends of the forward sections of the horizontal arms to facilitate positioning of the header with respect to the upper edge of the wind screen.

\* \* \* \* \*

UNITED STATES PATENT AND TRADEMARK OFFICE
CERTIFICATE OF CORRECTION

PATENT NO. : 8,474,899 B2  
APPLICATION NO. : 13/469384  
DATED : July 2, 2013  
INVENTOR(S) : Jeffrey A. Moran and Ali Azadi Page 1 of 1

It is certified that error appears in the above-identified patent and that said Letters Patent is hereby corrected as shown below:

In the Claims

At column 16, beginning at line 53, claim 31 should be deleted.

Signed and Sealed this  
First Day of October, 2013

Teresa Stanek Rea  
*Deputy Director of the United States Patent and Trademark Office*

UNITED STATES PATENT AND TRADEMARK OFFICE
CERTIFICATE OF CORRECTION

PATENT NO. : 8,474,899 B2  
APPLICATION NO. : 13/469384  
DATED : July 2, 2013  
INVENTOR(S) : Jeffrey A. Moran and Ali Azadi Page 1 of 2

It is certified that error appears in the above-identified patent and that said Letters Patent is hereby corrected as shown below:

Delete the title page and substitute therefore with the attached title page showing the corrected number of claims in patent.

In the Claims  
At column 16, beginning at line 53, claim 31 should be deleted.

This certificate supersedes the Certificate of Correction issued October 1, 2013.

Signed and Sealed this  
Twenty-fourth Day of December, 2013

Margaret A. Focarino  
*Commissioner for Patents of the United States Patent and Trademark Office*

(12) United States Patent
Moran et al.

(10) Patent No.: US 8,474,899 B2
(45) Date of Patent: Jul. 2, 2013

(54) RETRACTABLE TOP FOR OFF-ROAD VEHICLES

(75) Inventors: Jeffrey A. Moran, Ft. White, FL (US); Ali Azadi, Duluth, GA (US)

(73) Assignee: Omix-Ada, Inc., Suwanee, GA (US)

( * ) Notice: Subject to any disclaimer, the term of this patent is extended or adjusted under 35 U.S.C. 154(b) by 0 days.

(21) Appl. No.: 13/469,384

(22) Filed: May 11, 2012

(65) Prior Publication Data
US 2012/0286540 A1     Nov. 15, 2012

Related U.S. Application Data

(60) Provisional application No. 61/485,172, filed on May 12, 2011.

(51) Int. Cl.
*B60P 7/02*     (2006.01)

(52) U.S. Cl.
USPC ........................... 296/100.18; 296/107.01

(58) Field of Classification Search
USPC ................ 296/107.01, 100.18, 116, 114
See application file for complete search history.

(56) References Cited

U.S. PATENT DOCUMENTS

| | | | | |
|---|---|---|---|---|
| 5,992,917 A * | 11/1999 | Hilliard et al. | ............ | 296/103 |
| 6,095,589 A * | 8/2000 | Kinnanen et al. | ........ | 296/107.09 |
| 6,295,713 B1 * | 10/2001 | Hilliard et al. | ............ | 29/446 |
| 6,409,248 B1 * | 6/2002 | Bores | ............ | 296/122 |
| 6,981,914 B2 * | 1/2006 | Veenstra | ............ | 454/164 |

* cited by examiner

*Primary Examiner* — Lori Lyjak
(74) *Attorney, Agent, or Firm* — Womble Carlyle Sandridge & Rice, LLP

(57) ABSTRACT

A retractable top is disclosed for off-road vehicle such as Jeep® Wrangler® and CJ® brand vehicles. The top includes a frame and a fabric cover designed to cover and move with the frame. The frame includes a base plate that is secured to the belt rail surrounding the rear compartment of the vehicle. The top is deployable between a stowed configuration folded upon itself over the rear compartment of a vehicle and a deployed configuration covering the passenger and rear compartments of the vehicle. During deployment, the top unfolds in a substantially vertical direction over the rear compartment substantially to its full extent. This avoids collision with the rear doors and roll bars of the vehicle. Once so deployed, the entire top pivots downwardly into place covering the passenger and rear compartments of the vehicle.

30 Claims, 21 Drawing Sheets